United States Patent
Li et al.

(10) Patent No.: US 11,310,838 B2
(45) Date of Patent: Apr. 19, 2022

(54) UPLINK AND DOWNLINK PREEMPTION INDICATIONS

(71) Applicant: QUALCOMM Incorporated, San Diego, CA (US)

(72) Inventors: Chih Ping Li, San Diego, CA (US); Jing Jiang, San Diego, CA (US); Jing Sun, San Diego, CA (US); Wanshi Chen, San Diego, CA (US); Seyedkianoush Hosseini, San Diego, CA (US); Jay Kumar Sundararajan, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 16/273,886

(22) Filed: Feb. 12, 2019

(65) Prior Publication Data

US 2019/0254081 A1    Aug. 15, 2019

Related U.S. Application Data

(60) Provisional application No. 62/630,546, filed on Feb. 14, 2018.

(51) Int. Cl.
*H04W 74/08* (2009.01)
*H04L 5/00* (2006.01)
(Continued)

(52) U.S. Cl.
CPC ....... *H04W 74/0841* (2013.01); *H04L 1/1607* (2013.01); *H04L 5/005* (2013.01);
(Continued)

(58) Field of Classification Search
CPC ......... H04W 74/0841; H04W 72/1242; H04W 72/0446; H04W 76/11; H04W 72/1284;
(Continued)

(56) References Cited

U.S. PATENT DOCUMENTS

| 2015/0270997 A1* | 9/2015 | Martinez | H04L 27/265 375/343 |
| 2017/0238293 A1* | 8/2017 | Lei | H04L 5/1415 370/280 |

(Continued)

OTHER PUBLICATIONS

Qualcomm Incorporated: "URLLC DL pre-emption and UL suspension indication channel design," vol. RAN WG1, No. Nagoya, Japan; Sep. 18, 2017-Sep. 21, 2017 Sep. 17, 2017 (Sep. 17, 2017), (Year: 2017).*

(Continued)

*Primary Examiner* — Walter J Divito
(74) *Attorney, Agent, or Firm* — Patterson & Sheridan, L.L.P.

(57) ABSTRACT

Certain aspects of the present disclosure provide techniques and apparatus for signaling channel preemption indications that enable a user equipment (UE) of a first type to take one or more actions on resources that are re-allocated to an UE of a second type. An exemplary method generally includes determining that resources allocated for a scheduled transmission by a first user equipment (UE) of a first type overlaps with uplink channel resources allocated to a second UE of a second type. The method also includes signaling, based on the determination, an uplink preemption indication (ULPI), to the second UE, that identifies at least some of the overlapping resources.

57 Claims, 18 Drawing Sheets

(51) Int. Cl.
*H04W 72/04* (2009.01)
*H04L 5/14* (2006.01)
*H04W 76/11* (2018.01)
*H04L 1/16* (2006.01)
*H04W 72/12* (2009.01)

(52) U.S. Cl.
CPC ........... *H04L 5/14* (2013.01); *H04W 72/0446* (2013.01); *H04W 72/1242* (2013.01); *H04W 76/11* (2018.02)

(58) Field of Classification Search
CPC ......... H04W 72/0413; H04W 72/0453; H04W 52/146; H04L 5/005; H04L 5/14; H04L 1/1607; H04L 5/0053; H04L 5/0051; H04L 1/0013
See application file for complete search history.

(56) References Cited

U.S. PATENT DOCUMENTS

| | | | | |
|---|---|---|---|---|
| 2018/0014284 A1* | 1/2018 | Yi | ........................ | H04L 5/0096 |
| 2018/0035459 A1* | 2/2018 | Islam | .................... | H04W 74/04 |
| 2019/0059093 A1* | 2/2019 | Cheng | ................... | H04W 24/10 |
| 2020/0022160 A1* | 1/2020 | Zou | .................. | H04W 72/1242 |
| 2020/0119895 A1* | 4/2020 | Choi | ..................... | H04W 76/27 |
| 2021/0126753 A1* | 4/2021 | Mochizuki | ............ | H04L 5/0037 |
| 2021/0167930 A1* | 6/2021 | Jeon | ...................... | H04L 5/0094 |

OTHER PUBLICATIONS

Qualcomm in view of Qualcomm Incorporated: "URLLC DL pre-emption and UL suspension indication channel design," vol. RAN WG1, No. Reno, Nevada, US; Nov. 27, 2017-Dec. 1, 2017 Nov. 18, 2017 (Nov. 18, 2017) (Year: 2017).*
Interdigital Inc: "On UL multiplexing of transmission with different reliability requirements," vol. RAN WG1, No. Vancouver, Canada; Jan. 22, 2018-Jan. 26, 2018 Jan. 13, 2018 (Jan. 13, 2018) (Year: 2018).*
InterDigital Inc., "On UL multiplexing of transmission with different reliability requirements", 3GPP TSG RAN WG1 Meeting AH 1801 , R1-1800633 (Year: 2018).*
Qualcomm Inc., "URLLC DL pre-emption and UL suspension indication channel design", 3GPP TSG-RAN WG1 NR Ad-Hoc #3, R1-1716434 (Year: 2017).*
Qualcomm Inc., "URLLC DL pre-emption and UL suspension indication channel design", 3GPP TSG-RAN WG1 #91, R1-1720692 (Year: 2017).*
International Search Report and Written Opinion—PCT/US2019/017869—ISA/EPO—dated Apr. 10, 2019.

* cited by examiner

UPLINK AND DOWNLINK PREEMPTION INDICATIONS

CROSS-REFERENCE TO RELATED APPLICATION & PRIORITY CLAIM

The present Application for patent claims priority to U.S. Provisional Application No. 62/630,546, filed Feb. 14, 2018, which is assigned to the assignee of the present application and hereby expressly incorporated by reference herein in its entirety.

BACKGROUND

Field of the Disclosure

Aspects of the present disclosure relate generally to wireless communications systems, and more particularly, to techniques for signaling channel preemption indications that enable a user equipment (UE) of a first type to take one or more actions (e.g., suspend or control power for channel transmissions) on resources that are re-allocated to an UE of a second type.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communication that may be performed, for example, by a base station (BS). The method generally includes determining that resources allocated for a scheduled transmission by a first user equipment (UE) of a first type overlaps with uplink channel resources allocated to a second UE of a second type. The method also includes signaling, based on the determination, an uplink preemption indication (ULPI), to the second UE, that identifies at least some of the overlapping resources.

Certain aspects of the present disclosure provide a method for wireless communication that may be performed, for example, by a user equipment (UE). The method generally includes signaling an uplink signal to a base station (BS) via uplink channel resources allocated to the first UE of a first type, receiving an uplink preemption indication (ULPI) from the BS, and taking one or more actions based on one or more resources identified in the ULPI, wherein the one or more resources overlap with resources allocated for a scheduled transmission by a second UE of a second type.

Certain aspects of the present disclosure provide a method for wireless communication that may be performed, for example, by a base station (BS). The method generally includes determining that resources allocated for a transmission to a first user equipment (UE) of a first type overlap with downlink channel resources allocated to a second UE of a second type. The method also includes signaling, based on the determination, a downlink preemption indication (DLPI), to the second UE, that comprises cross-carrier information and identifies at least some of the overlapping resources.

Certain aspects of the present disclosure provide a method for wireless communication that may be performed, for example, by a user equipment (UE). The method generally includes receiving a downlink signal from a base station (BS) using one or more downlink channel resources allocated to the first UE of a first type, receiving a downlink preemption indication (DLPI) comprising cross-carrier information from the BS, and taking one or more actions based on one or more resources identified in the DLPI, wherein the one or more resources overlap with resources allocated for a scheduled transmission to a second UE of a second type.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
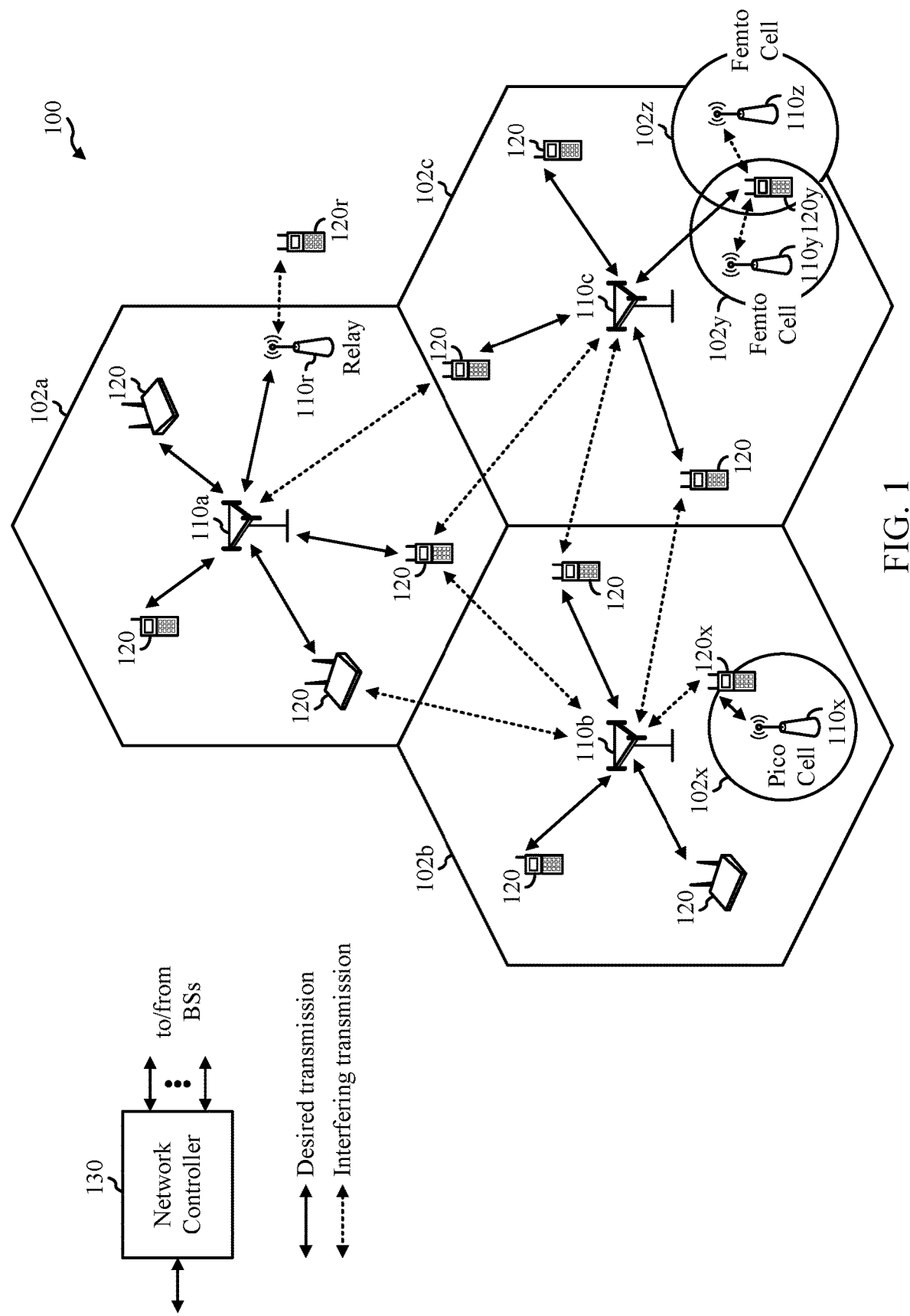
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology). NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure provide techniques and apparatus for dynamic switching between non-codebook and codebook based uplink transmission schemes.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network 110 may be a new radio (NR) or 5G network. In certain aspects, a BS 110 may signal an uplink preemption indication (ULPI) to a UE of a first type (e.g., eMBB UE) to reallocate uplink channel resources to a UE of a second type (e.g., URLLC UE) as further described herein with respect to FIGS. 8 and 9. In other aspects, the BS 110 may signal a downlink preemption indication (DLPI) to the UE of the first type (e.g., eMBB UE) to reallocate downlink channel resources to the UE of the second type (e.g., URLLC UE) as further described herein with respect to FIGS. 25 and 26.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, a macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.8 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. For certain NR networks, such as eMBB and/or URLLC, each subframe may include a subcarrier including up to 4 slots. A slot may be include to 14 minislots and up to 14 OFDM symbols. A minislot may include one or more OFDM symbols. OFDM symbols in a slot can be classified as downlink, flexible (i.e., downlink or uplink), or uplink. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G NB, NB, TRP, AP) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
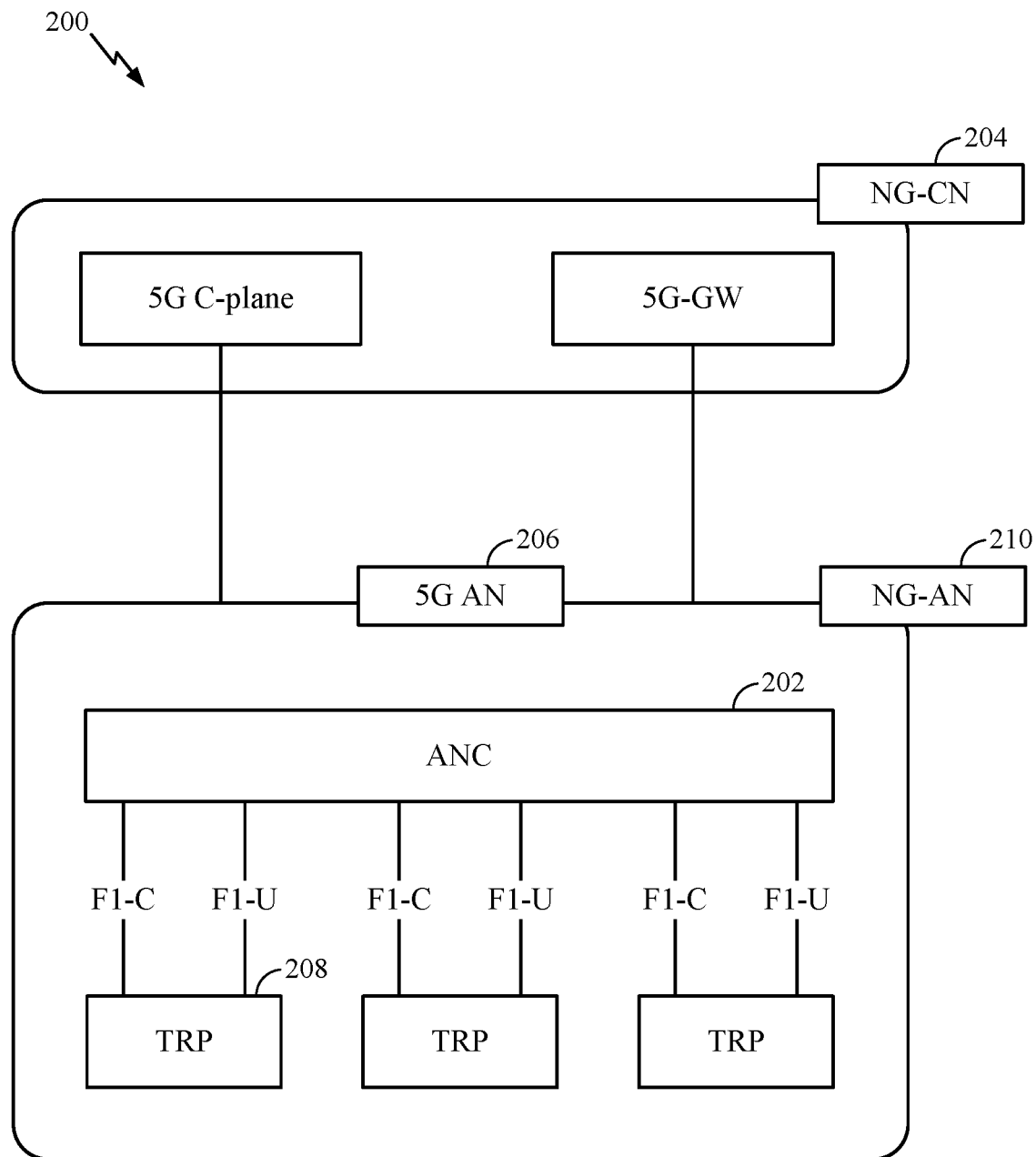
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
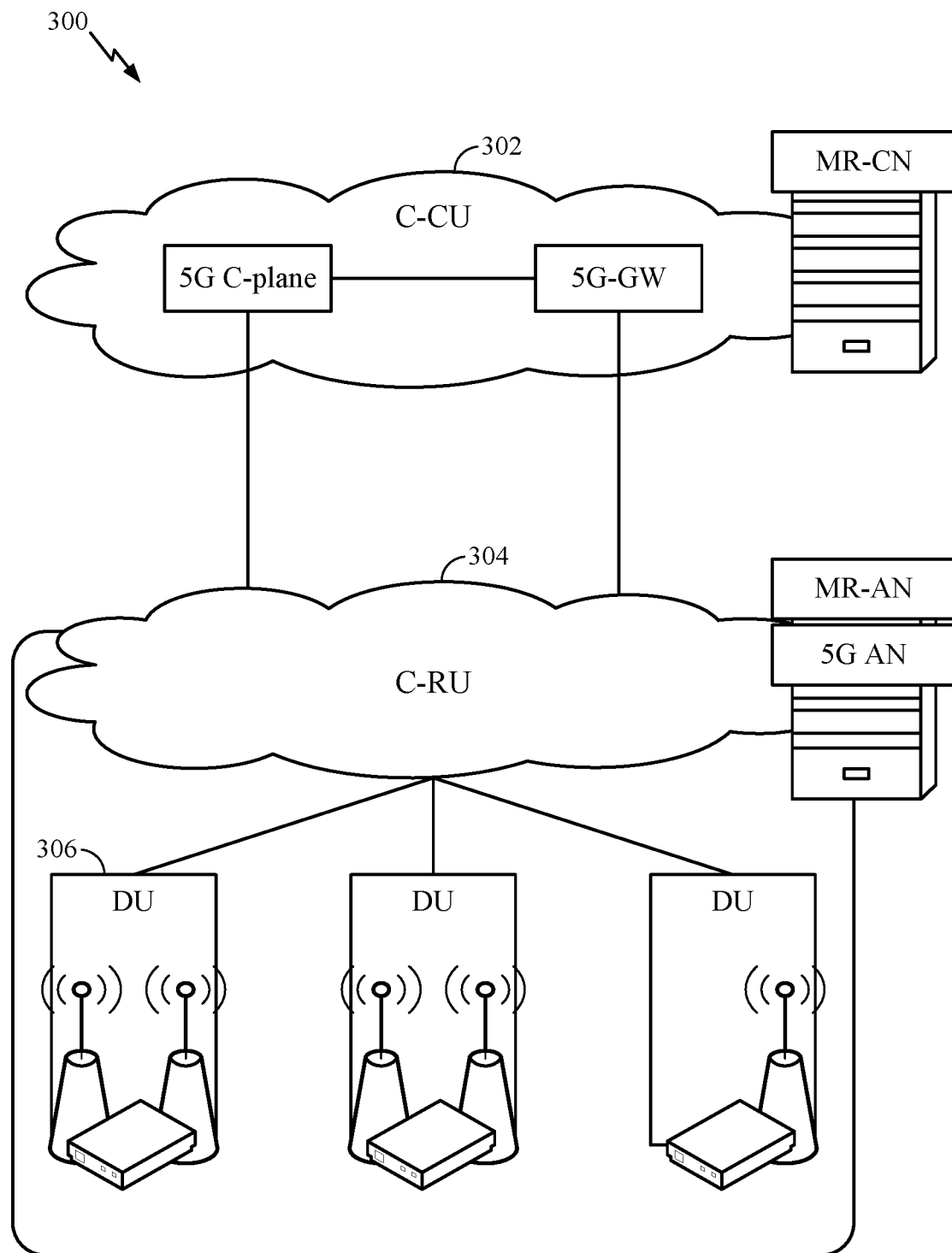
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
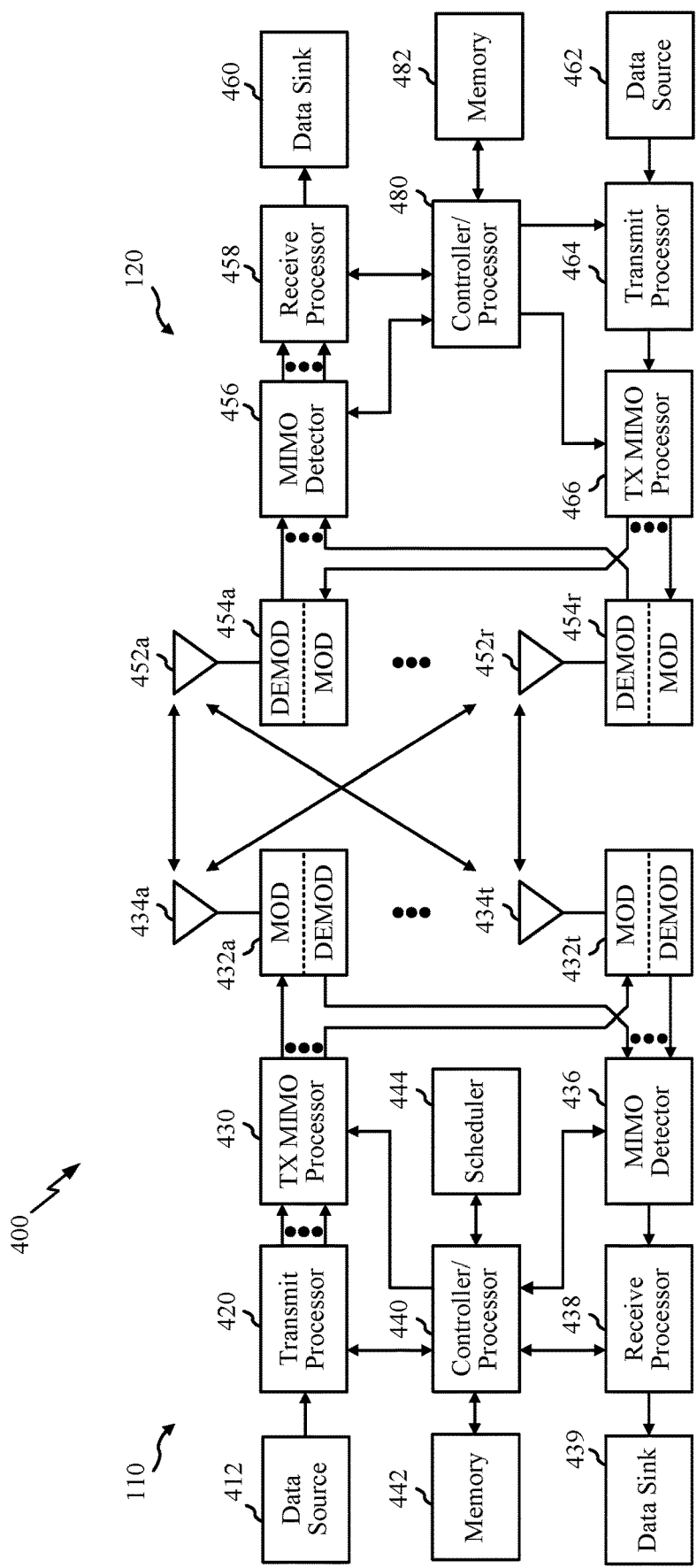
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 8 and 9.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct, e.g., the execution of the functional blocks illustrated in FIGS. 8 and 27 and/or other processes for the techniques described herein. The processor 480 and/or other processors and modules at the UE 120 may also perform or direct, e.g., the execution of the functional blocks illustrated in FIGS. 9 and 28 and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
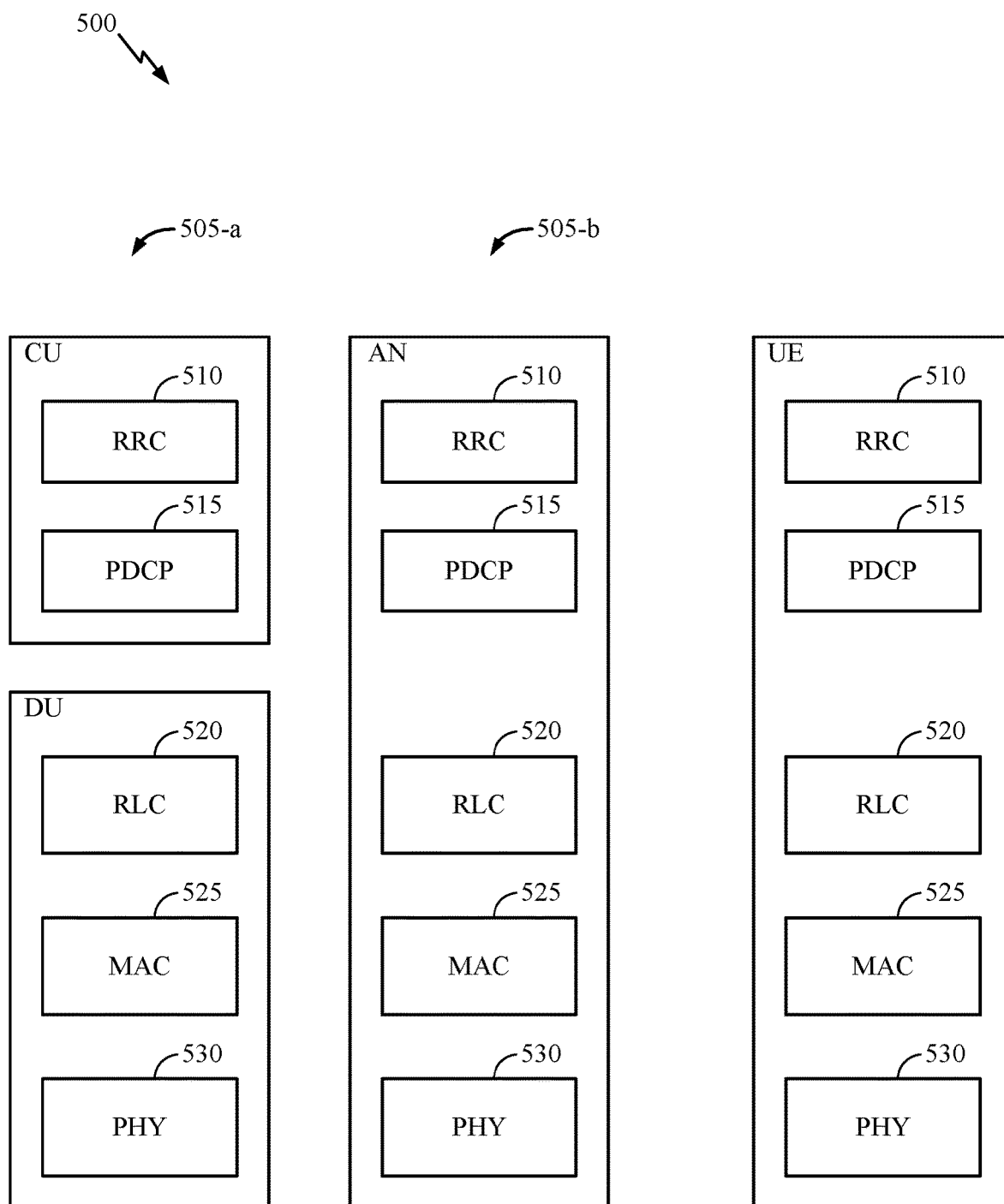
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
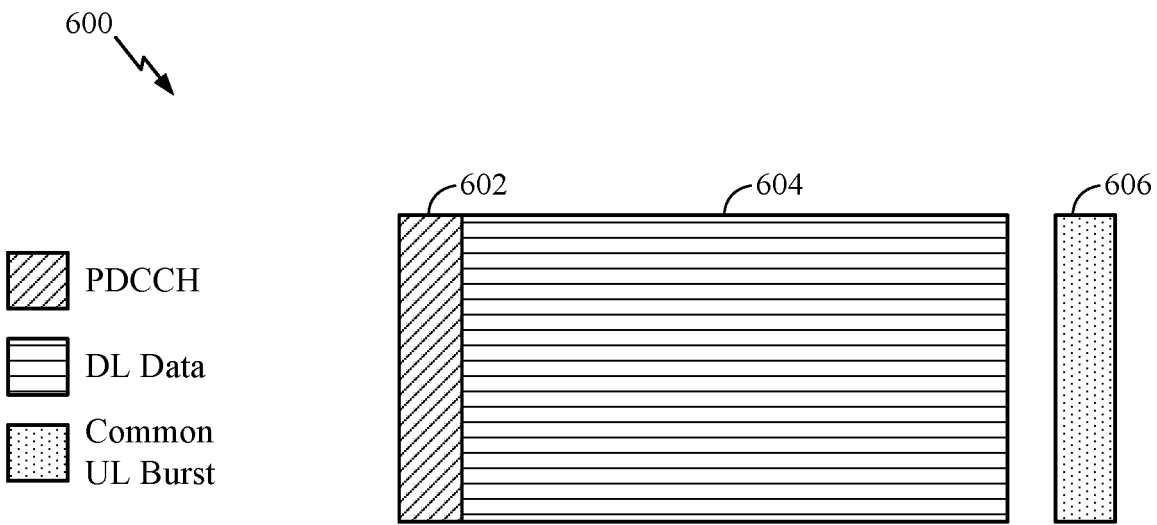
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
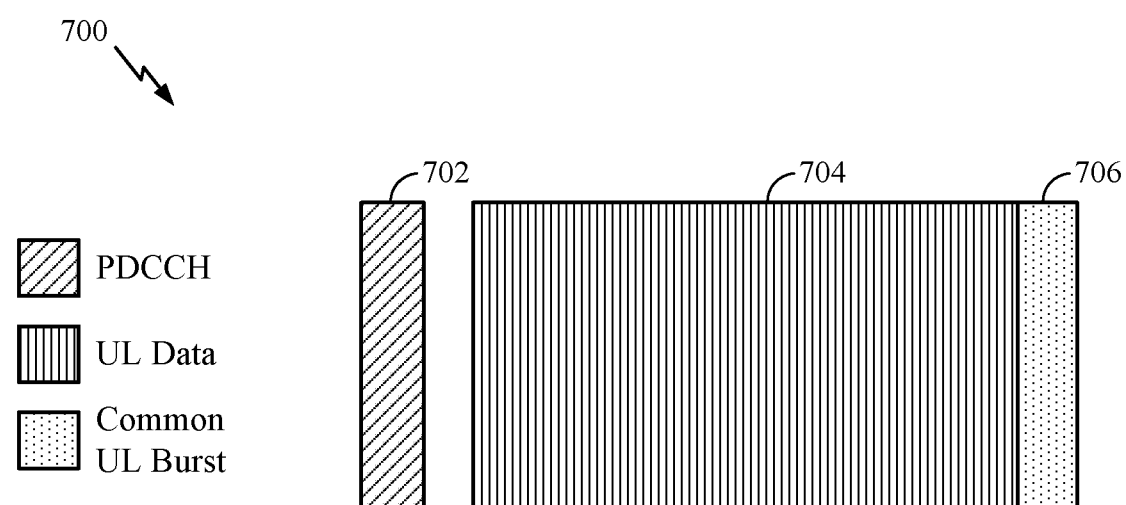
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion 602 described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein. In one example, a frame may include both UL centric subframes and DL centric subframes. In this example, the ratio of UL centric subframes to DL subframes in a frame may be dynamically adjusted based on the amount of UL data and the amount of DL data that are transmitted. For example, if there is more UL data, then the ratio of UL centric subframes to DL subframes may be increased. Conversely, if there is more DL data, then the ratio of UL centric subframes to DL subframes may be decreased.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet-of-Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

In wireless communications, channel state information (CSI) may refers to known channel properties of a communication link. The CSI may represent the combined effects of, for example, scattering, fading, and power decay with distance between a transmitter and receiver. Channel estimation may be performed to determine these effects on the channel. CSI may be used to adapt transmissions based on the current channel conditions, which is useful for achieving reliable communication, in particular, with high data rates in multi-antenna systems. CSI is typically estimated at the receiver, quantized, and fed back to the transmitter.

Example Uplink Preemption Indication

Certain communication systems (e.g., NR) maintain ultra-reliable low latency communication (0) which provides requirements for latency and reliability. For example, URLLC may provide an end-to-end latency of 10 milliseconds and block error ratio (BLER) of $10^{-5}$ within 1 millisecond. In order to improve URLLC services, the RAN may signal to a UE to suspend or perform power control on ongoing transmissions when URLLC transmissions are scheduled. This preemption of resources may facilitate a reduction in interference with the URLLC transmissions. As further described herein, the RAN may transmit an indication to the eMBB UE to take one or more actions to reduce interference with a scheduled URLLC transmission.

Aspects presented herein provide techniques for signaling an uplink preemption indication (ULPI) to a UE of a first type (e.g., eMBB UE) to reallocate uplink channel resources to a UE of a second type (e.g., URLLC UE).

Figure 8:
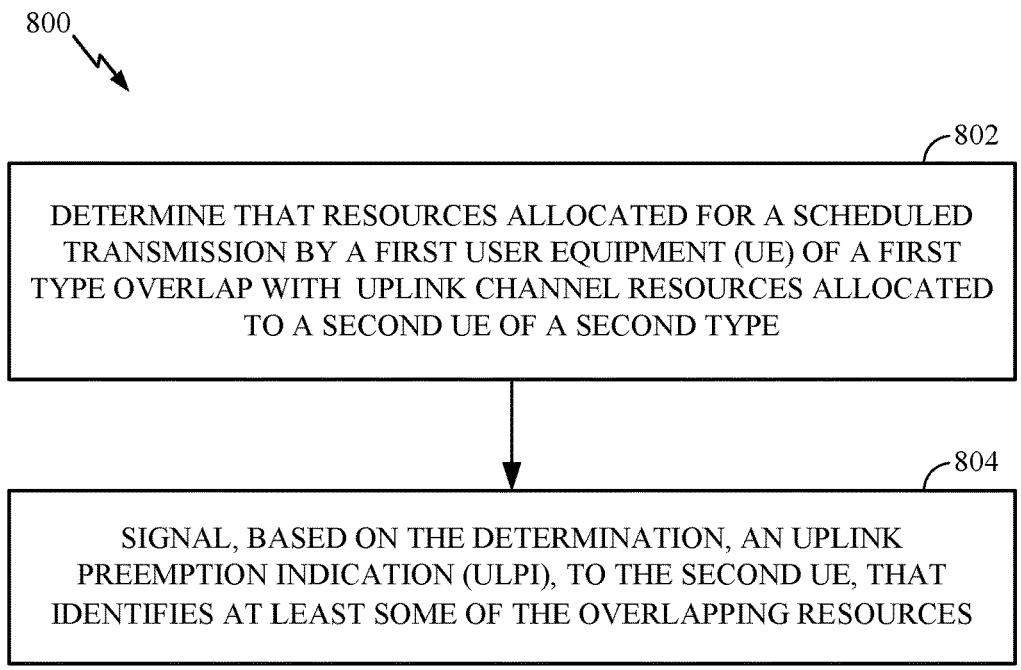
FIG. 8 is a flow diagram illustrating example operations that may be performed by a BS, in accordance with certain aspects of the present disclosure.

FIG. 8 is a flow diagram illustrating example operations 800 that may be performed, for example, by a base station and/or radio access network (e.g., BS 110 of FIG. 1), for implementing an uplink preemption indication (ULPI), in accordance with certain aspects of the present disclosure. Operations 800 may be implemented as software components that are executed and run on one or more processors (e.g., processor 440 of FIG. 4). Further, the transmission and reception of signals by the BS in operations 800 may be enabled, for example, by one or more antennas (e.g., antennas 434 of FIG. 4). In certain aspects, the transmission and/or reception of signals by the BS may be implemented via a bus interface of one or more processors (e.g., processor 440) obtaining and/or outputting signals.

Operations 800 may begin, at 802, by the BS determining that resources allocated for a scheduled transmission by a first user equipment (UE) of a first type (e.g., URLLC UE) overlap with uplink channel resources allocated to a second UE of a second type (e.g., eMBB UE). At 804, the BS signals, based on the determination at 802, an uplink preemption indication (ULPI), to the second UE, that identifies at least some of the overlapping resources.

Figure 9:
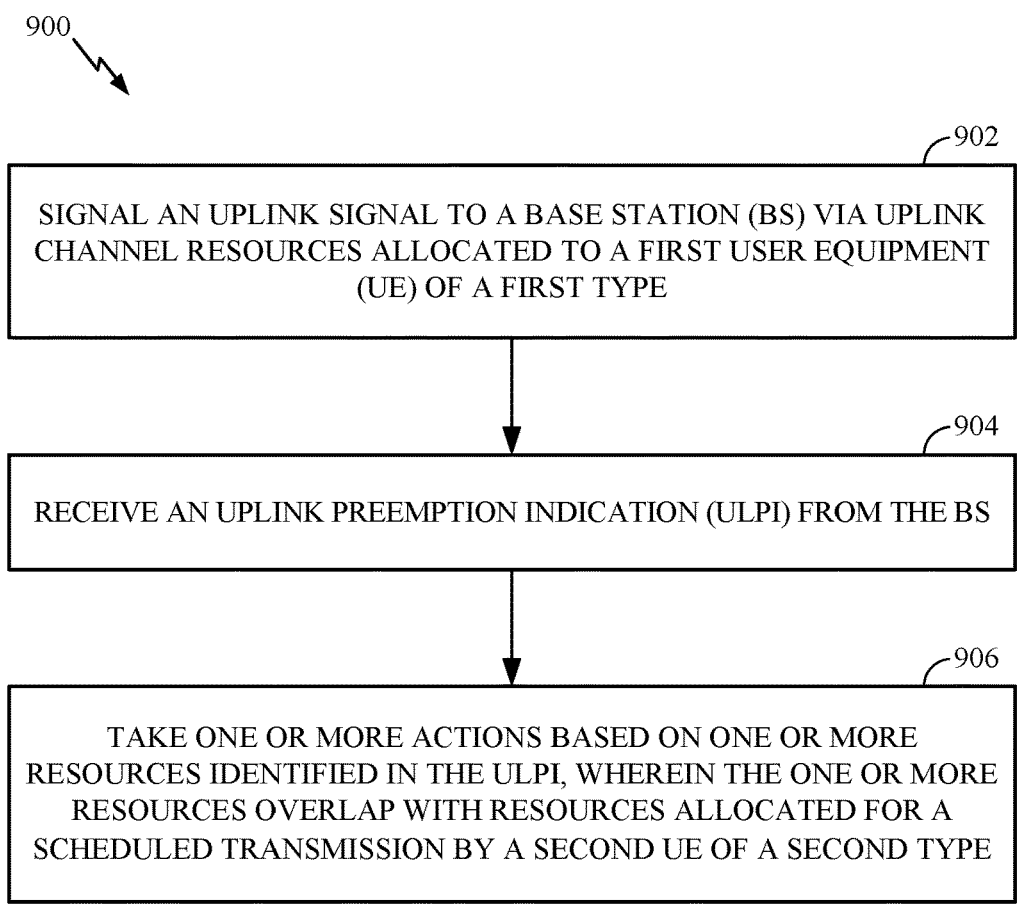
FIG. 9 is a flow diagram illustrating example operations that may be performed by a UE, in accordance with certain aspects of the present disclosure.

FIG. 9 is a flow diagram illustrating example operations 900 that may be performed, for example, by a UE (e.g., UE 120), for implementing the reception and processing of the ULPI, in accordance with certain aspects of the present disclosure. Operations 900 may be implemented as software components that are executed and run on one or more processors (e.g., processor 480 of FIG. 4). Further, the transmission and reception of signals by the UE in operations 900 may be enabled, for example, by one or more antennas (e.g., antennas 452 of FIG. 4). In certain aspects, the transmission and/or reception of signals by the UE may be implemented via a bus interface of one or more processors (e.g., processor 480) obtaining and/or outputting signals.

Operations 900 may begin, at 902, by the UE signaling an uplink signal to a base station (BS) via uplink channel resources allocated to a first UE of a first type (e.g., eMBB UE). At 904, the first UE receives an uplink preemption indication (ULPI) from the BS. At 906, the first UE takes one or more actions, as further described herein, based on one or more resources identified in the ULPI, wherein the one or more resources overlap with resources allocated for a scheduled transmission by a second UE of a second type (e.g., URLLC UE).

In certain aspects, taking one or more actions may include various actions taken by the UE as further described herein. For example, taking one or more actions may include reducing a transmit power during the scheduled transmission. Taking one or more actions may also include suspending a transmission by the first UE during the scheduled transmission. Taking one or more actions may also include resuming a transmission by the first UE after the scheduled transmission. In certain aspects, taking one or more actions may depend on the identified resources being a physical uplink control channel (PUCCH) resources, semi-persistently scheduled (SPS) resources, sounding reference signal (SRS) resources, physical random access channel (PRACH) resources, physical broadcast channels (PBCH) resources, demodulation reference signal (DMRS) resources, synchronization signal block (SSB) resources, phase-track reference signal (PTRS) resources, channel state information reference signal (C SIRS) resources and the like as further described herein.

Figure 10:
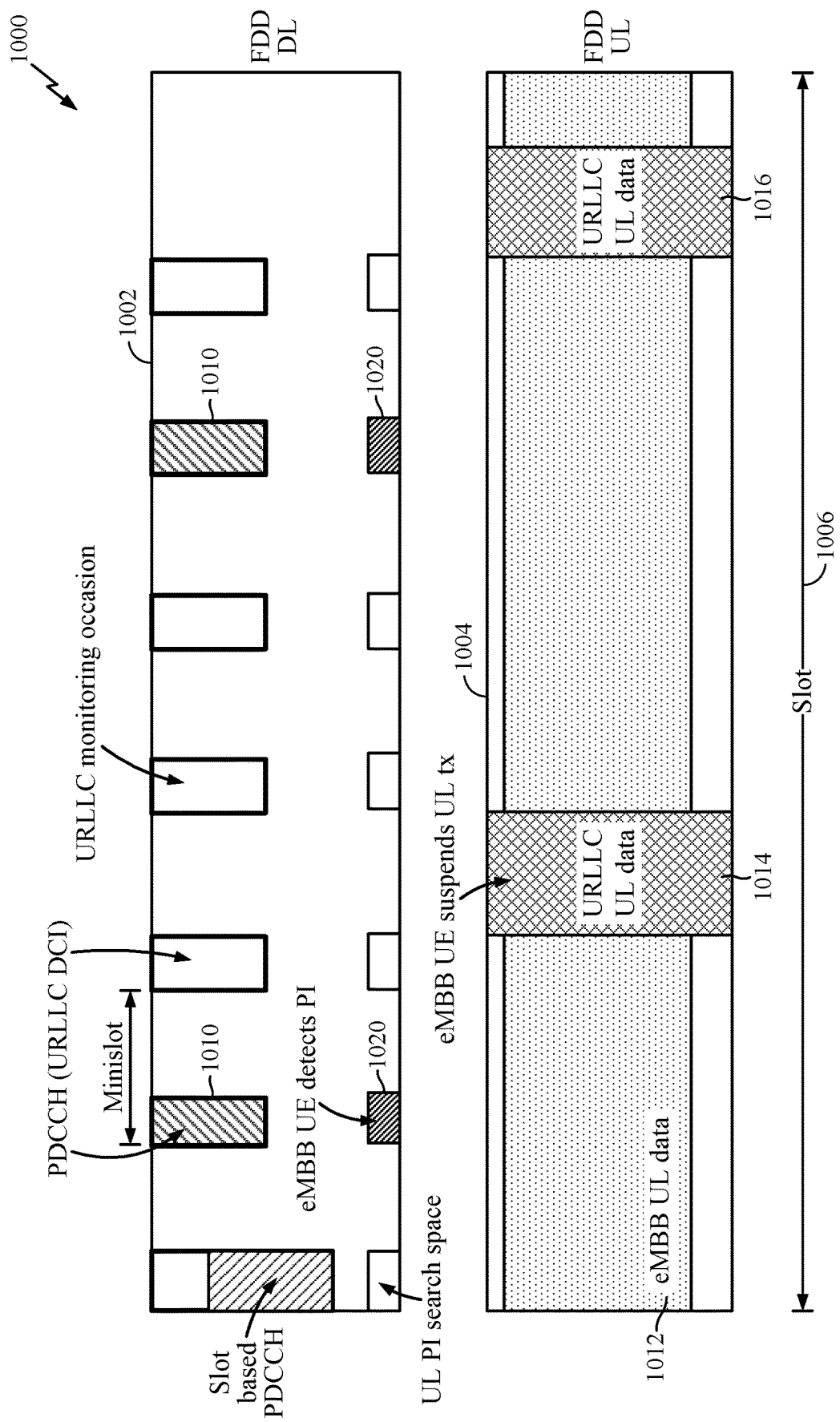
FIG. 10 illustrates a diagram of example channels implementing channel preemption, in accordance with certain aspects of the present disclosure.

In certain aspects, the eMBB UE may receive the ULPI via downlink signaling and suspend any transmissions scheduled during the URLLC transmissions as indicated by the ULPI. For example, FIG. 10 illustrates a frequency-timing diagram of an example downlink channel 1002 and uplink channel 1004, in accordance with aspects of the present disclosure. As shown, the downlink and uplink channels 1002 and 1004 span a slot 1006. The BS may transmit an URLLC DCI 1010 and an ULPI 1020 via the DL-channel 1002. As the eMBB UE is transmitting UL data 1012 via the UL-channel 1004, the eMBB UE receives the ULPI and determines which of its allocated resources overlap with the scheduled URLLC transmission. The DCI 1010 may provide an UL grant to the URLLC UE and the URLLC UE may transmit UL data 1014 via the UL-channel 1004. At the same time the eMBB UE may suspend UL transmissions using the resources reallocated to the URLLC UE as indicated by the ULPI. This enables the URLLCs to avoid interference with eMBB transmissions and provide an optimal wireless environment for the URLLCs. In certain aspects, the BS may also periodically signal the ULPI to the eMBB UE every one or more OFDM symbols or slots as shown by the second ULPI 1020.

In certain aspects, the ULPI may be signaled via a different location of a search space and/or a control resource region than a downlink preemption indication (DLPI). The DLPI may also be signalled using a radio network temporary identifier (RNTI) distinct from an RNTI used to signal the DLPI. In certain aspects, the ULPI may be signaled using the same location of a search space and/or a control resource region and the same RNTI as the DLPI, but there is an additional indication to decide whether the signaling is for uplink or downlink preemption.

Figure 11:
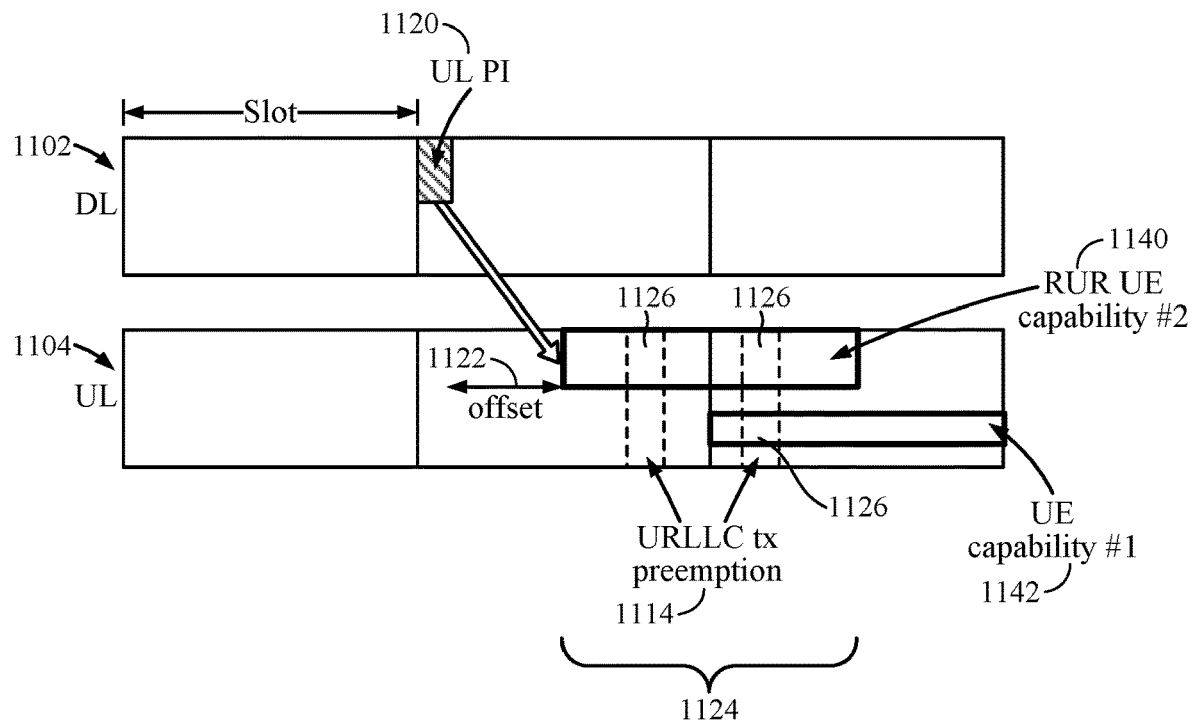
FIG. 11 illustrates a frequency-timing diagram of example downlink and uplink channels, in accordance with certain aspects of the present disclosure.

In certain aspects, the ULPI may identify one or more resources allocated to the eMBB UE relative to a time offset, a time duration, and one or more resources of a reference uplink region (RUR). For example, FIG. 11 illustrates a frequency-timing diagram of example downlink and uplink channels 1102 and 1104, respectively. As shown, the downlink and uplink channels 1102 and 1104 span three slots. In the second slot, ULPI 1120 is transmitted via downlink signaling. The ULPI may indicate an offset time 1122, which is, for example, relative to the transmit time of the ULPI as shown in FIG. 11. The offset time 1122 indicates to the eMBB UE when a RUR (e.g., RUR 1140) begins within the UL-channel 1104 and may be one or more minislots in length. The RUR is a resource map that includes a duration 1124 and one or more resources 1126 that are reallocated to the URLLC UE, which is granted UL resources 1114. The resources 1126 reallocated to the scheduled URLLC transmission may also be referred to, herein, as a preemption gap.

In certain aspects, the BS may service UEs having various capabilities, such as latency capabilities, and provide information in the ULPI to take into account these different types of UEs. For example, the ULPI 1120 may provide a second RUR 1142 that has an offset time longer in length than the first RUR 1140. That is, the ULPI 1120 may indicate to UEs, having a longer latency, an offset time that provides those UEs with enough time to respond to the ULPI 1120.

Figure 12:
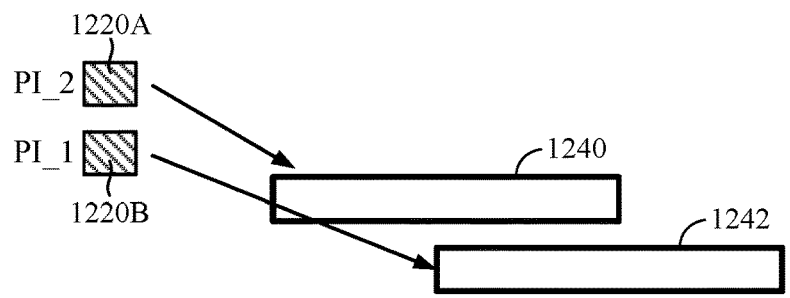
FIG. 12 illustrates a diagram of an example uplink preemption indication (ULPI) format, in accordance with certain aspects of the present disclosure.

In certain aspects, the ULPI may be exclusive to one or more UEs having a specific capability, such as a ULPI that is specific to a particular UE (i.e., a UE-specific ULPI). That is, the RAN may generate a ULPI for a group of UEs that have a specific capability, e.g., latency. For example, FIG. 12 illustrates a diagram of example ULPI formats 1220A and B, in accordance aspects of the present disclosure. As shown, ULPI format 1220A has RUR information 1240 that is exclusive to one or more UEs having a specific capability. Similarly, ULPI format 1220B has RUR information 1242 that is exclusive to one or more UEs having another specific capability.

Figure 13:
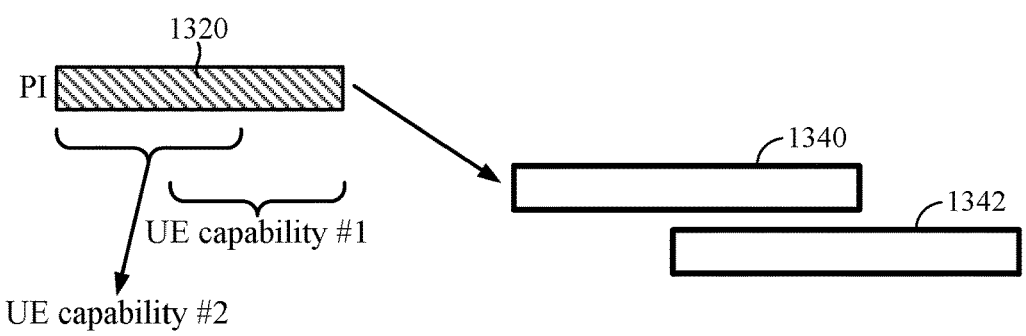
FIG. 13 illustrates a diagram of another example ULPI format, in accordance with certain aspects of the present disclosure.

In certain aspects, the ULPI may apply to UEs having different capabilities (e.g., latency), such as a ULPI that is common among a group of UEs (i.e., a group-common ULPI). That is, the RAN may generate a ULPI that has RUR information for UEs having different capabilities or a ULPI that is common among a group of UEs (i.e., a group-common ULPI). For example, FIG. 13 illustrates a diagram of an example ULPI format 1320, in accordance with certain aspects of the present disclosure. As shown, the ULPI format 1320 includes RUR information 1340 that applies to UEs having a specific capability and RUR information 1342 that applies to UEs having a different capability. As further described herein, the RUR information may be conveyed via a bitmap in the ULPI. When the ULPI applies to UEs having different capabilities, the UEs of one capability may use part of the bitmap, ignoring the rest of the RUR information in the bitmap used by the UEs of the other capability.

In certain aspects, the ULPI format may be determined based on the exchange of information between the RAN and the UE, such as exchanging RRC information. In some aspects, the ULPI format may be programmed in advance such that the RAN does not exchange information with a UE to determine the ULPI format compatible for that UE.

Figure 14:
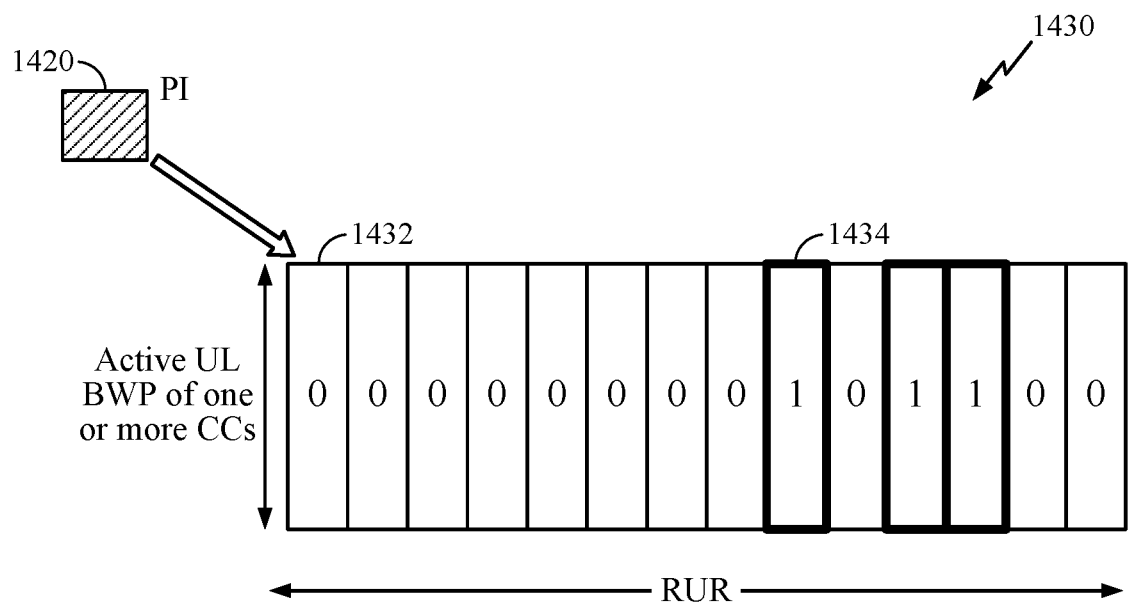
FIG. 14 illustrates a diagram of an example wideband bitmap, in accordance with certain aspects of the present disclosure.

In certain aspects, the ULPI may include a bitmap that identifies the one or more resources to be used during the scheduled URLLC transmission. The bitmap may define the duration of and resources included in the RUR. Each bit of the bitmap may represent various resource parameters. A bit of the bitmap may correspond to a wideband resource, a subband resource, or one or more OFDM symbols of the RUR. Wideband resources may refer to all frequency-domain resources in an active bandwidth part (BWP) of one component carrier, or in the active BWPs of component carriers in intra-band contiguous carrier aggregation. For instance, FIG. 14 illustrates a diagram of an example bitmap 1430, in accordance with certain aspects of the present disclosure. As shown, the ULPI 1420 provides a bitmap 1430 including 14 bits, where each bit represents a wideband uplink resource. The bitmap 1430 identifies uplink resources that are reallocated for the URLLC transmission. As shown, a bit 1432 having a value of "0" may indicate a resource not reallocated for URLLC transmission, and a bit 1434 having a value of "1" may indicate the resource that is identified as being reallocated for the URLLC transmission. The bits in a ULPI may be evenly distributed across the time duration of a RUR that can be one or more slots. As a result, each bit in the ULPI represents one or multiple OFDM symbols.

Figure 15:
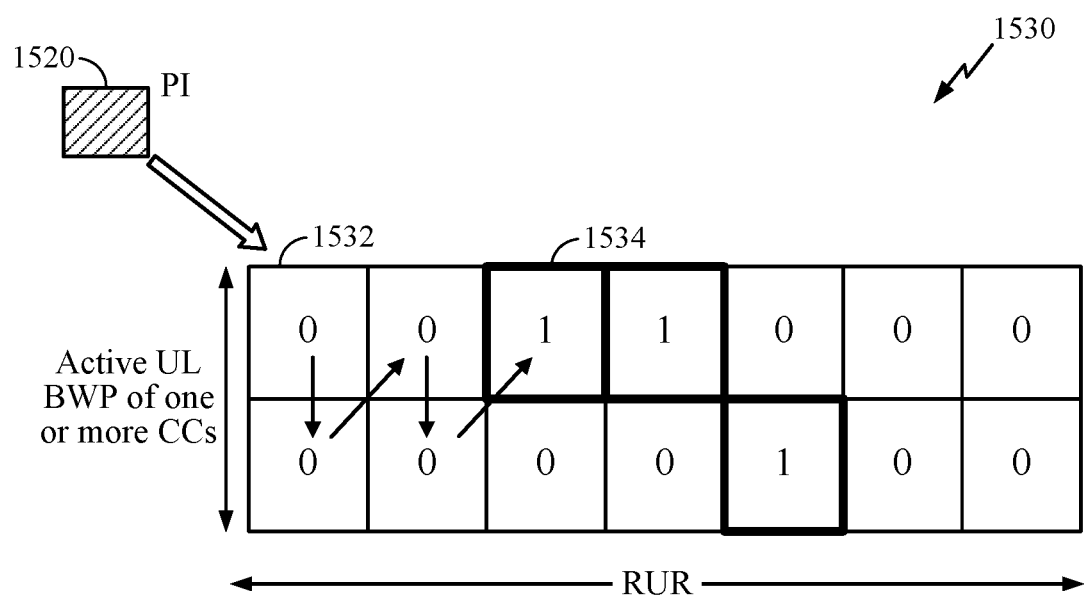
FIG. 15 illustrates a diagram of an example bitmap divided by subband, in accordance with certain aspects of the present disclosure.

FIG. 15 illustrates a diagram of an example bitmap 1530 divided by subband, in accordance with aspects of the present disclosure. As shown, the ULPI 1520 provides a bitmap 1530 including 14 bits, where each bit represents a subband uplink resource by dividing the RUR region equally by the 14 bits. In FIG. 15, the bit 1534 identifies a subband uplink resource that is reallocated for the URLLC transmission. Also, the bitmap 1530 may be formed by making bit 1532 the most significant bit (MSB), going down from the MSB to make the next bit in the bitmap, and up to the subband adjacent to the MSB to make the next bit in the bitmap, and so on as indicated by the arrows. Whereas each bit of FIG. 14 spans a single OFDM symbol, each bit of FIG. 15 spans two OFDM symbols, providing a time duration of 14 OFDM symbols for the RURs shown in FIGS. 14 and 15.

Figure 16:
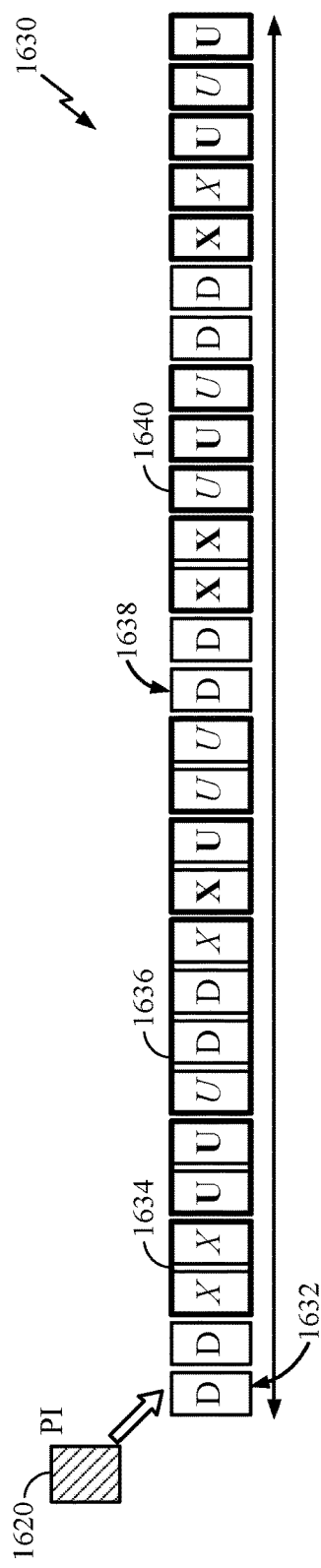
FIG. 16 illustrates a diagram of an example bitmap 1630 for a TDD configuration, in accordance with certain aspects of the present disclosure.

In certain aspects, the ULPI may include a bitmap that represents UL resources in a time division duplex (TDD) configuration. For example, FIG. 16 illustrates a diagram of an example bitmap 1630 for a TDD configuration, in accordance with certain aspects of the present disclosure. As shown, the ULPI 1620 provides a bitmap 1630 including 14 bits, where each bit represents one or more OFDM symbols of a wideband uplink resource by dividing the RUR region by the 14 bits as evenly as possible. The RUR represented by bitmap 1630 spans two slots that have 28 OFDM symbols. The first two downlink symbols 1632 in the subframe may be indicated as being omitted from the bitmap. That is, the UE may interpret the bitmap to indicate whether uplink or flexible resources are reallocated for URLLC transmission. The most significant bit of the bitmap is bit 1634 including two flexible OFDM symbols. The next bit of the bitmap corresponds to the two uplink symbols after bit 1634. Bit 1636 includes an uplink symbol, two downlink symbols, and a flexible symbol. The UE ignores any downlink resources associated with the bit or adjacent to the bit, such that the UE takes no action regarding the downlink resources that may be adjacent or within the bit. Similarly, the downlink resources 1638 are ignored or omitted from the bitmap. Each bit of the last bits starting with the bit 1640 covers a single uplink or flexible symbol.

Figure 17:
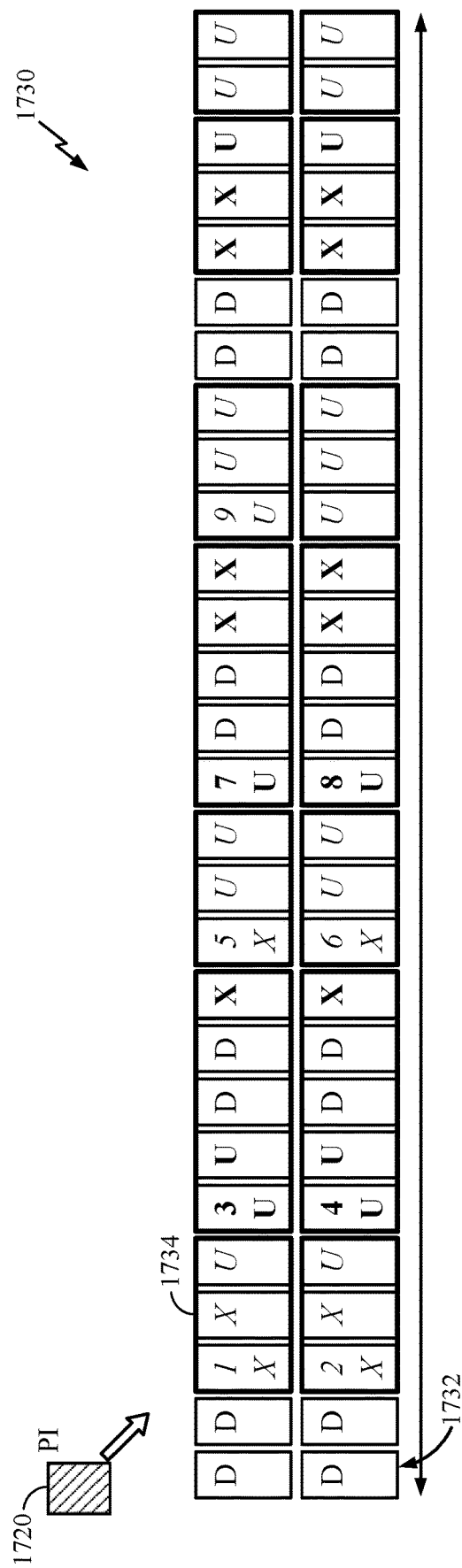
FIG. 17 illustrates a diagram of an example bitmap for a TDD configuration divided by subband, in accordance with certain aspects of the present disclosure.

Similar to FIG. 15, the ULPI may include a TDD bitmap that covers subband resources. For example, FIG. 17 illustrates a diagram of an example bitmap 1730 for a TDD configuration, in accordance with certain aspects of the present disclosure. As shown, the ULPI 1620 provides a bitmap 1630 including 14 bits, where each bit represents one or more OFDM symbols of a subband uplink resource by dividing the RUR region by the 14 bits as evenly as possible in the time and frequency domains. The first four downlink symbols 1632 in the subframe may be indicated as being omitted from the bitmap. As shown, the most significant bit is bit 1734, which has to six symbols within a subband. The bitmap is formed from the MSB 1734 similar to the progression indicated by the arrows in FIG. 15.

Figure 18:
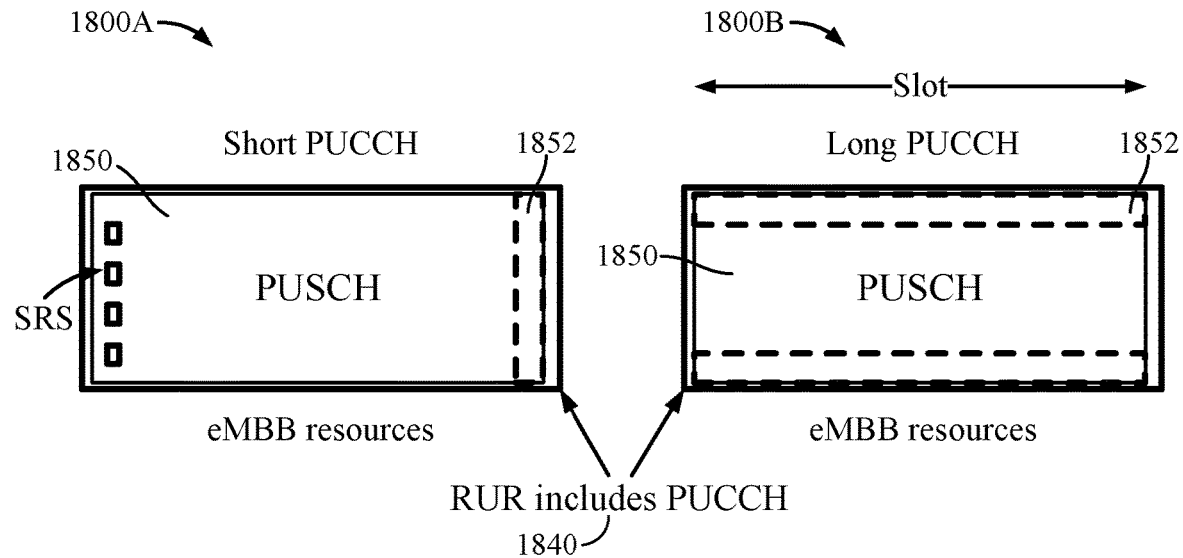
FIG. 18 illustrates an example diagram of uplink channels, in accordance with certain aspects of the present disclosure.

In certain aspects, the RUR of the ULPI may include or exclude one or more resources in a physical uplink control channel (PUCCH). For example, FIG. 18 illustrates an example diagram of uplink channels 1800A and B, in accordance with certain aspects of the present disclosure. As shown, the RUR 1840 includes physical uplink shared channel (PUSCH) resources 1850 and PUCCH resources 1852, which may be short or long PUCCH resources. The long PUCCH resources may span an entire slot as illustrated in FIG. 18. In cases where the RUR identifies PUCCH resources as being reallocated, the UE may continue to transmit control signaling using the PUCCH resources, suspend transmission of control signaling using the PUCCH resources, or reduce the power of transmissions using the PUCCH resources. Similarly, after transmitting the UPLI identifying PUCCH resources to be reallocated, the BS may receive uplink signals from the eMBB UE via the PUCCH resources during the scheduled transmission and decode the scheduled URLLC transmission based at least in part on the effect of the received uplink signals on the scheduled transmissions. For example, the BS may cancel out the received uplink signals to decode the scheduled URLLC transmission. In certain aspects, the scheduled URLLC transmissions may not use PUCCH resources of the eMBB UEs that are included in the RUR. That is, even though the RUR may include PUCCH resources, these resources may not be reallocated to URLLC transmissions.

Figure 19:
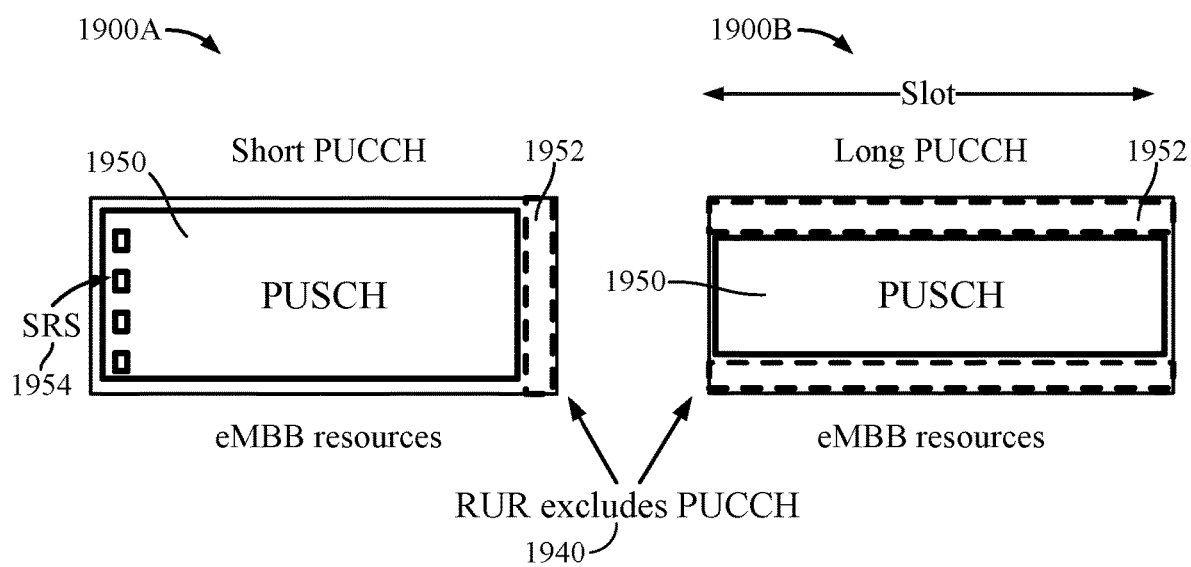
FIG. 19 illustrates an example diagram of uplink channels, in accordance with certain aspects of the present disclosure

FIG. 19 illustrates an example diagram of uplink channels 1900A and B where PUCCH resources 1952 are included in the RUR 1940, in accordance with certain aspects of the present disclosure. As shown, the RUR 1940 excludes PUCCH resources 1852, which may be short or long PUCCH resources, from being identified as reallocated resources.

In certain aspects, the RUR may include or exclude sounding reference signal (SRS) resources similar to the PUCCH resources as previously discussed. For example, FIG. 19 shows the RUR 1940 including SRS resources 1954. In cases where the RUR identifies SRS resources as being reallocated, the UE may continue to transmit the SRS using the SRS resources, suspend transmission of the SRS, or reduce the power of transmissions using the PUCCH resources. Similarly, after transmitting the UPLI indicating SRS resources are to be reallocated the BS may receive the SRS from the eMBB UE and decode the scheduled URLLC transmission based at least in part on the effect of the received SRS on the scheduled URLLC transmission. For instance, the BS may cancel out the received SRS to decode the scheduled URLLC transmission. In certain aspects, the scheduled URLLC transmissions may not use the SRS resources of the eMBB UEs that are included in the RUR. That is, even though the RUR may include SRS resources, these resources may not be reallocated to URLLC transmissions.

In certain aspects, the RUR may include or exclude other reference signal resources such as demodulation reference signals (DMRS), channel state information reference signals (CSIRS), and phase-tracking reference signals (PTRS). The RUR may include or exclude other physical-layer channels such as physical random access channels (PRACH) and physical broadcast channels (PBCH). The RUR may include or exclude synchronization signal resource blocks (SSB). In certain aspects, the resources used by reference signals, physical channels, and synchronization signals of eMBB UEs as exemplified above may or may not be reallocated to the URLLC transmissions, even when the resources are included in the RUR.

In certain aspects, the RUR may include the resources of reference signals, physical channels, and synchronization signals as previously described with respect to FIGS. 18 and 19, but these resources are not to be reallocated to URLLC transmissions based on certain predefined rules or radio resource control (RRC) configurations. In this case, the resource allocation of URLLC transmissions may be rate-matched around those resources. In certain aspects, the resources of reference signals, physical channels, and synchronization signals may be possible to be reallocated to URLLC transmissions based on certain predefined rules or radio resource control (RRC) configurations. In this case, the URLLC transmissions may reuse those resources regardless of whether eMBB UEs continue, suspend, or power control transmissions on those resources.

Figure 20:
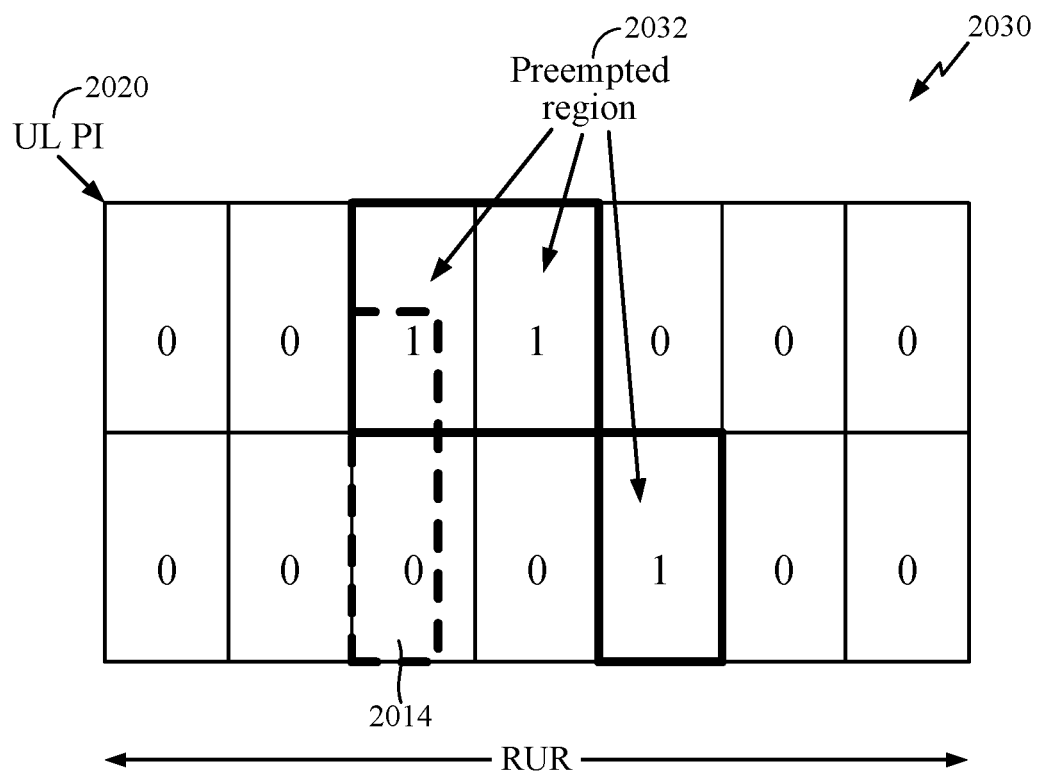
FIG. 20 illustrates a diagram of an example bitmap, in accordance with certain aspects of the present disclosure.

In certain aspects, the UE may assume the preemption gap applies to adjacent resources in the RUR. That is, taking one or more actions at 906 may include applying the one or more actions as described herein to a resource that is adjacent to one or more resources identified in the ULPI. For example, FIG. 20 illustrates a diagram of an example bitmap 2030, in accordance with certain aspects of the present disclosure. As shown, the ULPI 2020 provides a bitmap 2030 that identifies resources 2032 as being preempted by the reallocated resources. The UE may assume that the lower subband 2014 adjacent to one of the identified resources 2032 is also preempted and take one or more actions based on this assumption as described herein.

In certain cases, the ULPI may trigger a preemption gap in a UE's PUSCH transmission, for example, as the UE takes one or more actions based on the identified resources by suspending transmissions as indicated by the RUR. If the UE can preserve the phase continuity across the preemption gap, the BS may decode the received uplink signals having the preemption gap between. That is, the BS decodes the received signals if the UE is capable of preserving phase continuity across the preemption gap.

Figure 21:
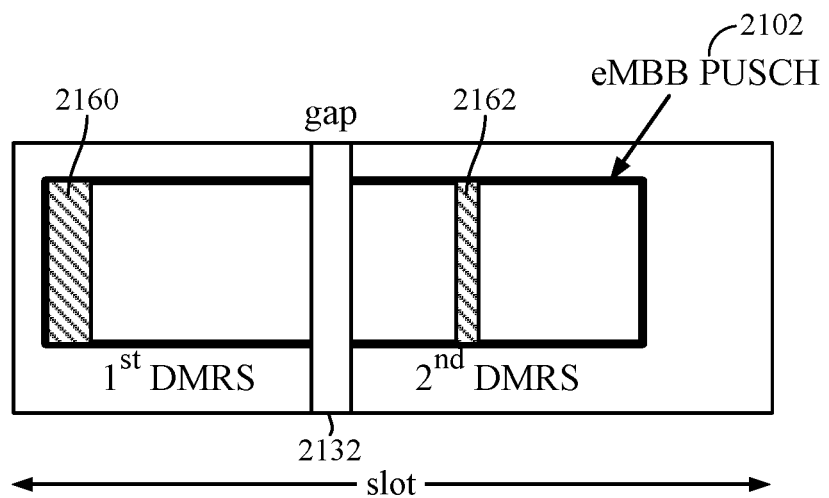
FIG. 21 illustrates a diagram of an example physical uplink shared channel (PUSCH), in accordance with certain aspects of the present disclosure.

In cases where the UE is not capable of maintaining the phase continuity, the UE may transmit a demodulation reference signal (DMRS) before and after the preemption gap. For example, FIG. 21 depicts a diagram of an example PUSCH transmission, in accordance with certain aspects of the present disclosure. As shown, the PUSCH transmission 2102 has a preemption gap splitting the transmission into two blocks of data. Not yet aware of the URLLC realloca-tion, the UE may initially transmit a DMRS 2160 to enable the BS to decode the PUSCH transmission based on the received DMRS. As the UE is transmitting, the UE may receive the ULPI, which triggers a preemption gap 2132 in the transmission as described herein with respect to operations 900. As the UE is incapable of maintaining phase continuity, the UE may or may not resume the PUSCH transmission partly based on whether a second DMRS 2162 is to be transmitted after the preemption gap.

In certain aspects, the ULPI may puncture the DMRS. That is, the ULPI may identify resources to be reallocated that coincide with the UE's transmission of the DMRS. In such a situation, the BS may determine not to decode at least a portion of the received signals based on a determination that the preemption gap punctures an expected DMRS. In cases where the preemption gap punctures the first DMRS (e.g., DMRS 2160), the BS may determine to drop the entire slot of uplink data. In cases where the preemption gap punctures the second DMRS (e.g., DMRS 2162), the BS may determine to drop the second block of data after the expected DMRS. A DMRS may be punctured if one or more symbols of the DMRS are punctured.

Figure 22:
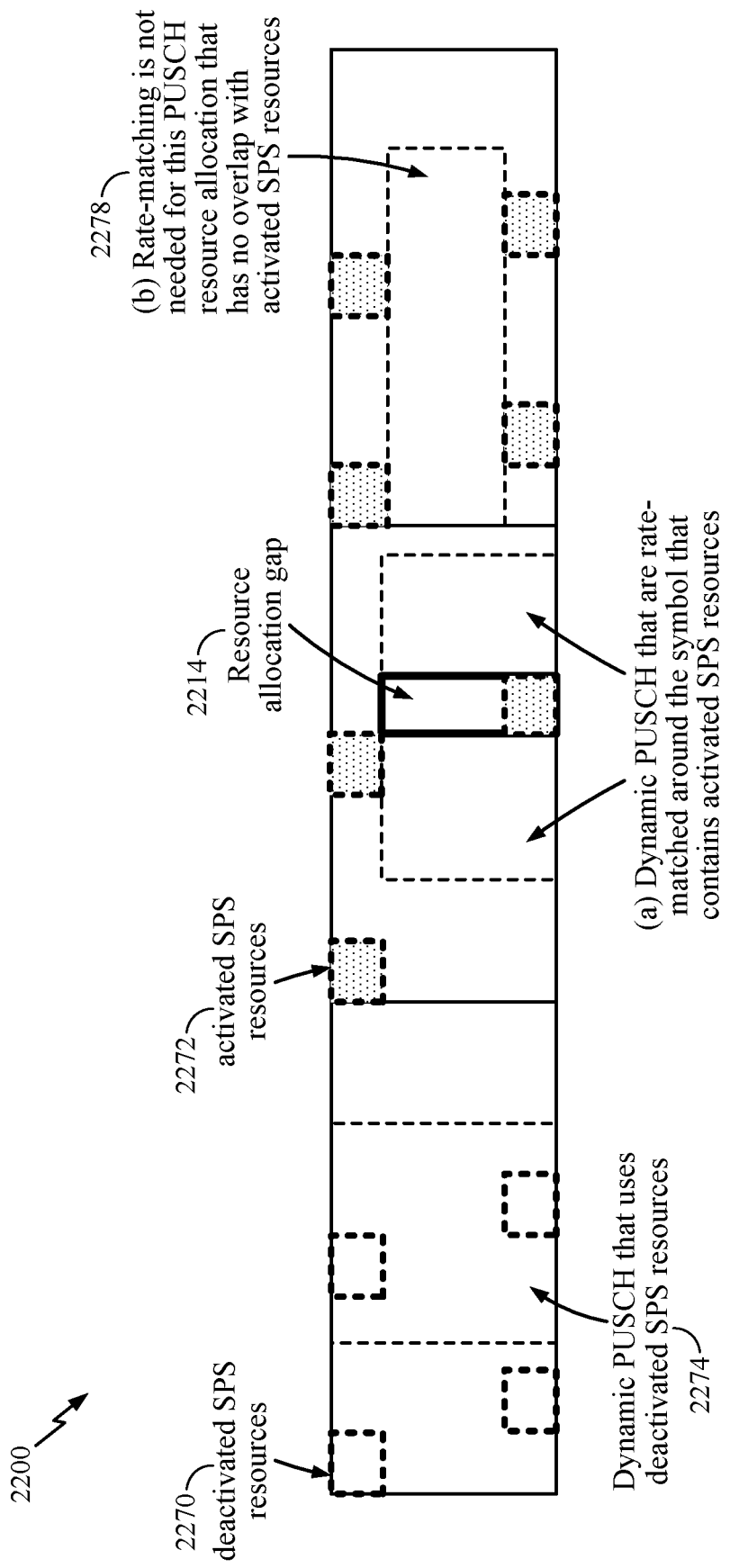
FIG. 22 illustrates a diagram of an example uplink channel having semi-persistently scheduled (SPS) resources, in accordance with certain aspects of the present disclosure.

In certain aspects, the ULPI may identify semi-persistently scheduled (SPS) resources to be reallocated for URLLC. The SPS resources are periodic and may be hopped in the frequency domain. FIG. 22 illustrates a diagram of an example uplink channel 2200 having SPS resources, in accordance with certain aspects of the present disclosure. As shown, the uplink channel 2200 includes deactivated SPS resources 2270 and activated SPS resources 2272. In the first slot, a UE is dynamically scheduled with PUSCH resources 2274 that use the deactivated SPS resources. In the second slot, the PUSCH resources 2276 overlap with activated SPS resources 2272 triggering a preemption gap 2214. The BS may transmit a ULPI that identifies the SPS resources to be activated and reallocated for URLLCs. The UE may then rate match around the activated SPS resources. In certain aspects, the BS may signal an uplink grant of the PUSCH resources to the UE that excludes the SPS resources (e.g., PUSCH resources 2278). The ULPI for SPS resources may be a bitmap that identifies one or more activated SPS resources, a status of the SPS resources (e.g., activated or deactivated), or a change of status of the SPS resources (e.g., from activated to deactivated and vice versa).

In certain aspects, the ULPI may include cross-carrier information. That is, the ULPI identifies resources corresponding to more than one component carrier. This enables the RAN to reduce the payload size of ULPIs and have a more compact ULPI format that service more than one component carrier. For example, up to 16 component carriers are supported in certain systems, resulting in a maximum payload size of 224 bits if 14 bits are provided in each ULPI representing each of the 16 component carriers. A ULPI payload of 224 bits may be too large to be included as part of a DCI message. Cross-carrier ULPIs can reduce the payload to indicate uplink preemption across more than one component carrier.

Figure 23:
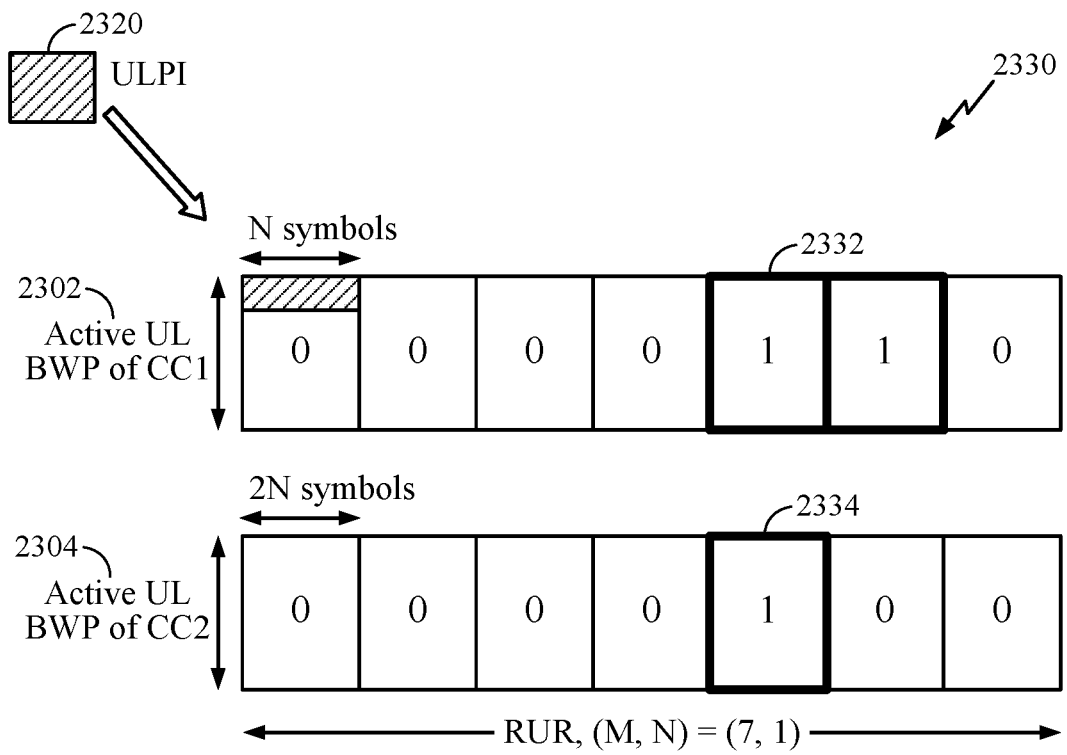
FIG. 23 illustrates a diagram of an example bitmap having cross-carrier information, in accordance with certain aspects of the present disclosure.

As an example of a cross-carrier ULPI, FIG. 23 illustrates a diagram of a bitmap 2330 having cross-carrier information, in accordance with certain aspects of the present disclosure. As shown, the ULPI 2320 provides a bitmap 2330 having 14 bits that correspond to more than one component carrier. The seven most significant bits may correspond to component carrier 2302, and the seven least significant bits may correspond to the other component carrier 2304. That is, the bitmap has two (7, 1) bitmaps for the (M, N) notation, where M provides the number of columns, i.e., symbols, of the RUR, and N provides the number of rows of the RUR, i.e., N indicates whether the bitmaps is wideband or subband. Each bit may correspond to one or more OFDM symbols and a wideband resource. In this example, the bitmap 2330 identifies bits 2332 and 2334 as being reallocated in the different component carriers 2302 and 2304.

Figure 24:
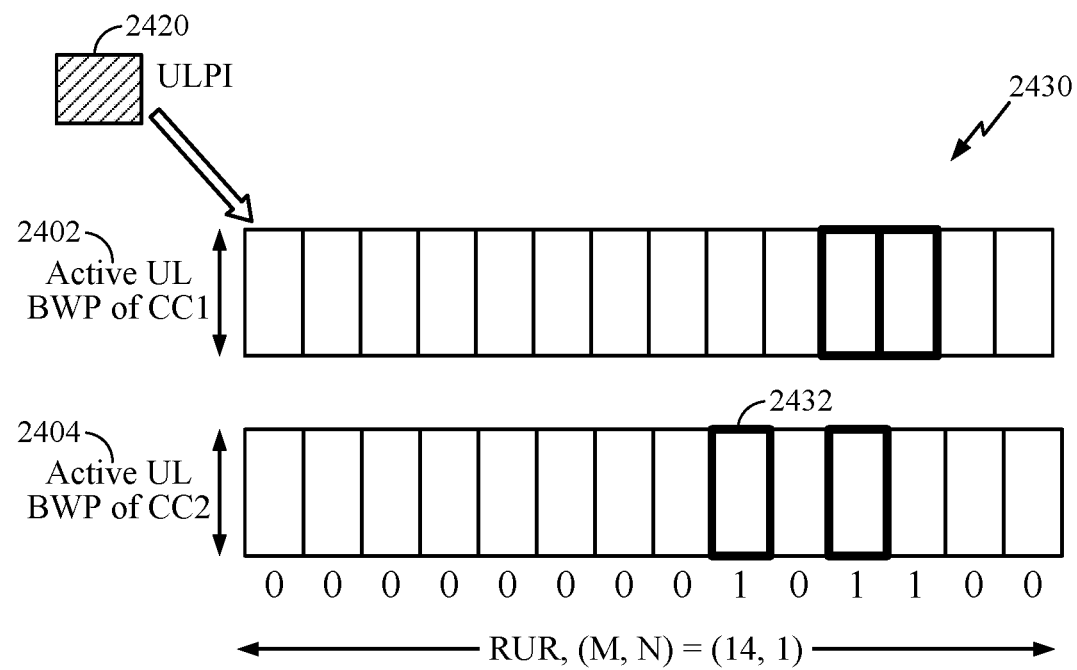
FIG. 24 illustrates a diagram of an example bitmap having cross-carrier information, in accordance with certain aspects of the present disclosure.

In certain aspects, each bit of the cross-carrier ULPI may correspond to more than one component carrier. For example, FIG. 24 depicts a diagram of a bitmap 2430 having cross-carrier information, in accordance with certain aspects of the present disclosure. As shown, the ULPI 2420 provides a bitmap 2430 having 14 bits (M=14, N=1), where each bit corresponds to more than one component carrier. In this example, the UE may treat bit 2432 as identifying both respective resources in component carriers 2402 and 2404 as being reallocated, even if only the resource of component carrier 2404 is being reallocated for bit 2432. That is, the UE may assume both resources in the component carriers 2402 and 2404 are being reallocated regardless of whether the resources are actually reallocated.

Example Downlink Preemption Indication

In certain aspects, the RAN may signal to an eMBB UE that downlink resources were reallocated to URLLC transmissions via a downlink preemption indication (DLPI). The DLPI may identify downlink resources that were reallocated in the past. That is, the DLPI may indicate to the UE to discard signals received via the identified resources in the reference downlink region (RDR). Similar to the ULPI previously discussed, the DLPI may also include cross-carrier information, which enables the RAN to service multiple component carriers or bandwidth parts for downlink preemption with a reduced payload.

Aspects presented herein provide techniques for signaling a downlink preemption indication (DLPI) to a UE of a first type (e.g., eMBB UE) to reallocate downlink channel resources to a UE of a second type (e.g., URLLC UE).

Figure 25:
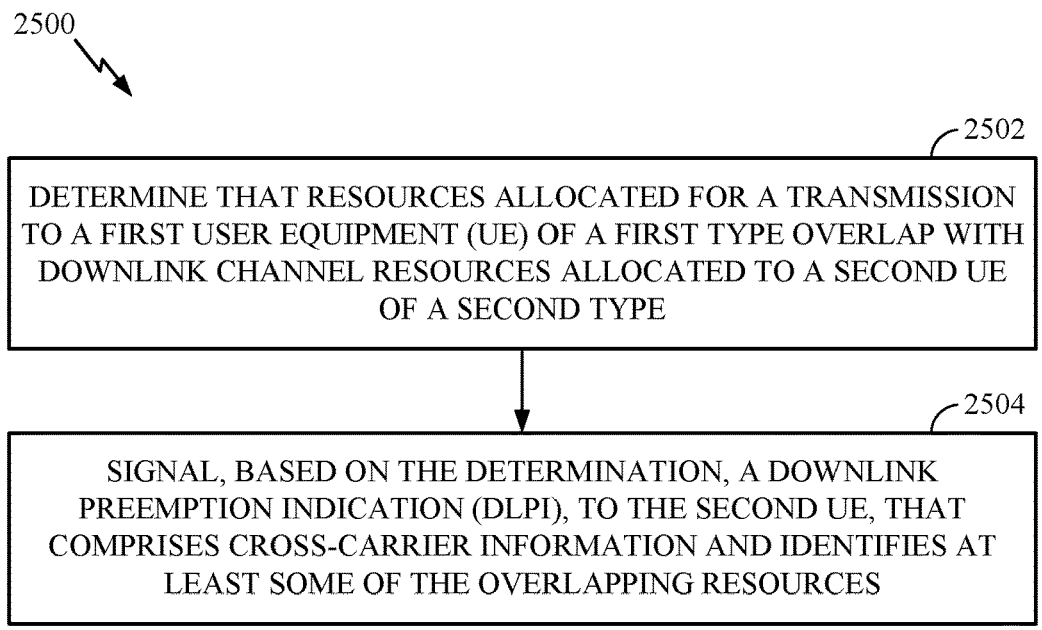
FIG. 25 is a flow diagram illustrating example operations that may be performed by a BS, in accordance with certain aspects of the present disclosure

FIG. 25 is a flow diagram illustrating example operations 2500 that may be performed, for example, by a base station and/or radio access network (e.g., BS 110 of FIG. 1), for implementing a downlink preemption indication (DLPI), in accordance with certain aspects of the present disclosure. Operations 2500 may be implemented as software components that are executed and run on one or more processors (e.g., processor 440 of FIG. 4). Further, the transmission and reception of signals by the BS in operations 2500 may be enabled, for example, by one or more antennas (e.g., antennas 434 of FIG. 4). In certain aspects, the transmission and/or reception of signals by the BS may be implemented via a bus interface of one or more processors (e.g., processor 440) obtaining and/or outputting signals.

Operations 2500 may begin, at 2502, by the BS determining that resources allocated for a transmission to a first UE (e.g., URLLC UE) of a first type overlap with downlink channel resources allocated to a second UE of a second type (e.g., eMBB UE). At 2504, the BS signals, based on the determination at 2502, a downlink preemption indication (DLPI), to the second UE, that comprises cross-carrier information and identifies at least some of the overlapping resources.

Figure 26:
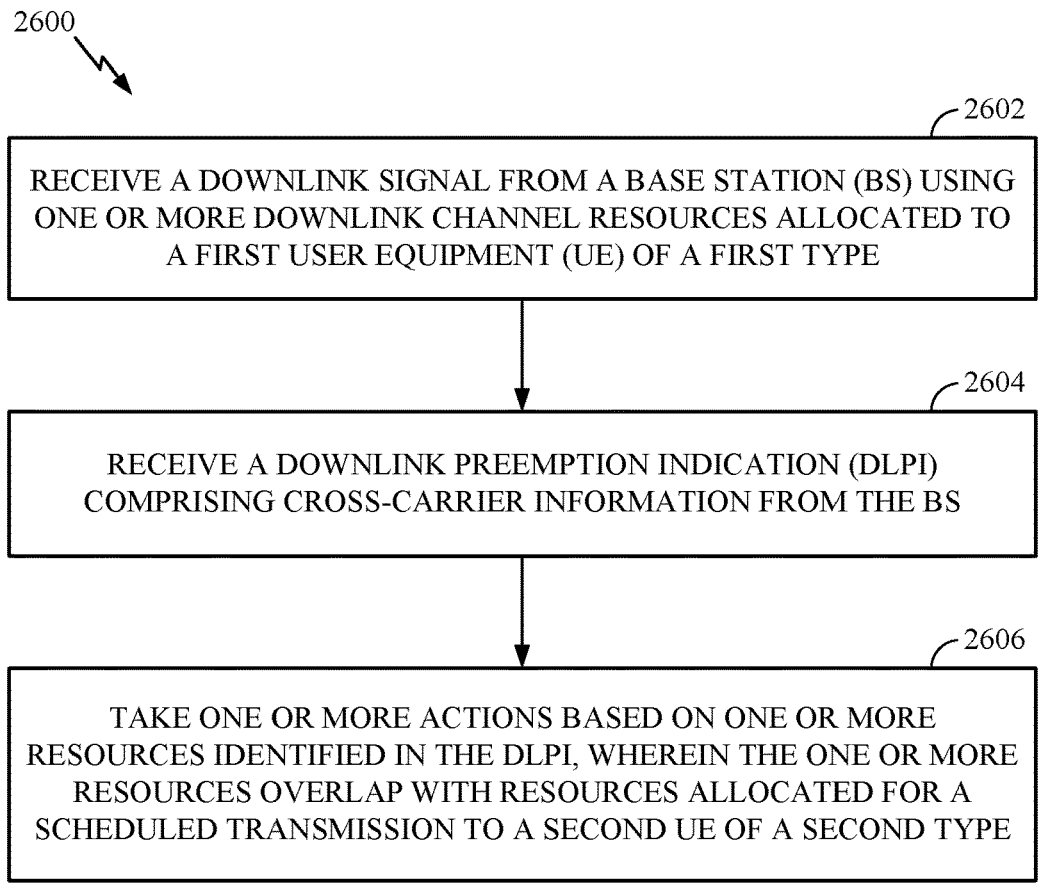
FIG. 26 is a flow diagram illustrating example operations that may be performed by an UE, in accordance with certain aspects of the present disclosure

FIG. 26 is a flow diagram illustrating example operations 2600 that may be performed, for example, by a UE (e.g., UE 120), for implementing the reception and processing of the ULPI, in accordance with certain aspects of the present disclosure. Operations 2600 may be implemented as software components that are executed and run on one or more processors (e.g., processor 480 of FIG. 4). Further, the transmission and reception of signals by the UE in operations 2600 may be enabled, for example, by one or more antennas (e.g., antennas 452 of FIG. 4). In certain aspects, the transmission and/or reception of signals by the UE may be implemented via a bus interface of one or more processors (e.g., processor 480) obtaining and/or outputting signals.

Operations 2600 may begin, at 2602, by the UE receiving a downlink signal from a base station (BS) using one or more downlink channel resources allocated to the a UE of a first type (e.g., eMBB UE). At 2604, the first UE receives a downlink preemption indication (DLPI) comprising cross-carrier information from the BS. At 2606, the first UE takes one or more actions based on one or more resources identified in the DLPI, wherein the one or more resources overlap with resources allocated for a scheduled transmission to a second UE of a second type (e.g., URLLC UE). For example, the UE may discard signals received by the identified resources during the scheduled transmission as those signals may be contaminated with URLLC interference.

Figure 27:
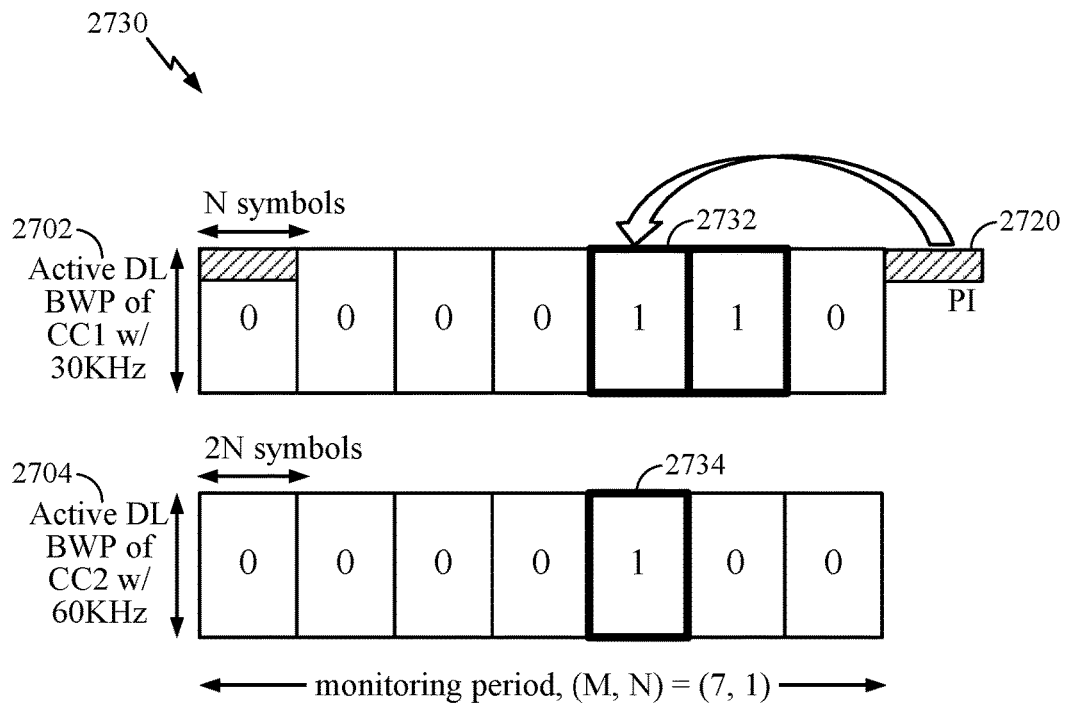
FIG. 27 illustrates a diagram of an example bitmap having cross-carrier information, in accordance with certain aspects of the present disclosure.

In certain aspects, the DLPI may include cross-carrier information, which may be formed similar to the cross-carrier information previously discussed for the DLPI of FIGS. 23 and 24. For example, FIG. 27 illustrates a diagram of a bitmap 2730 having cross-carrier information, in accordance with certain aspects of the present disclosure. As shown, the DLPI 2720 provides a bitmap 2730 having 14 bits that correspond to more than one component carrier. The seven most significant bits may correspond to component carrier 2702, and the seven least significant bits may correspond to the other component carrier 2704. That is, the bitmap includes two (M=7, N=1) bitmaps as described herein with respect to FIG. 23. Each bit may correspond to one or more OFDM symbols and a wideband resource. In this example, the bitmap 2730 identifies bits 2732 and 2734 as being reallocated in the different component carriers 2702 and 2704.

Figure 28:
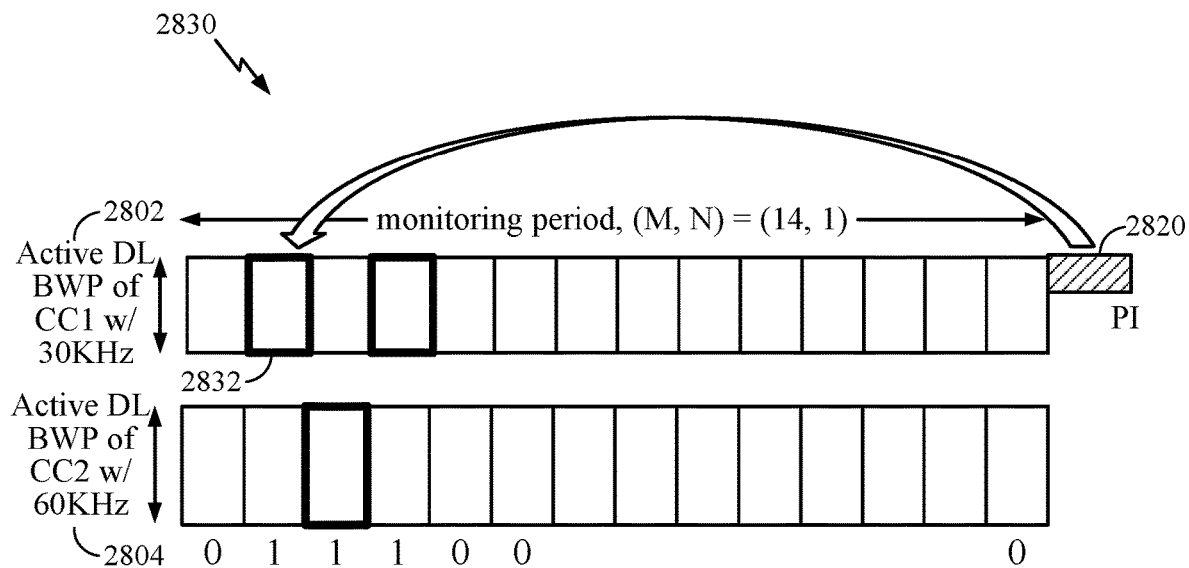
FIG. 28 illustrates a diagram of an example bitmap having cross-carrier information, in accordance with certain aspects of the present disclosure.

In certain aspects, each bit of the cross-carrier DLPI may correspond to more than one component carrier similar to the bitmap of FIG. 24. For example, FIG. 28 depicts a diagram of a bitmap 2830 having cross-carrier information, in accordance with certain aspects of the present disclosure. As shown, the DLPI 2820 provides a bitmap 2830 having 14 bits (M=14, N=1), where each bit corresponds to more than one component carrier. In this example, the UE may treat bit 2832 as identifying the respective resources in component carriers 2802 and 2804 as being reallocated, regardless of whether the resources are actually reallocated.

In certain aspects, the DLPI may be broadcast to more than UE having the same carrier indicator field (CIF). That is, the DLPI may be exclusive to a specific value of the CIF assigned to one or more UEs. The CIF may provide a basis for identifying the reference downlink region in the DLPI. That is, the RDR may be relative to the CIF assigned to a UE. In certain aspects, the DLPI may be exclusive to a UE having a specific value of the CIF. That is, the DLPI may be applicable to a single UE and its CIF.

In certain aspects, the cross-carrier DLPI may include multiple distinct DLPI bitmaps, each of which applies to one or more UEs having the same CIF, i.e., the same cross-carrier configuration. UEs having a specific value of CIF may be provided and/or preconfigured with an indication that allows the UEs to locate its DLPI bitmap in the cross-carrier DLPI.

Each bit of the DLPI bitmap may represent various resource parameters. A bit of the bitmap may correspond to a wideband resource, a subband resource, or one or more OFDM symbols of a RDR as described herein with respect to FIGS. 14-17. The DLPI may also employ the same TDD techniques described herein with respect to FIGS. 16 and 17.

Figure 29:
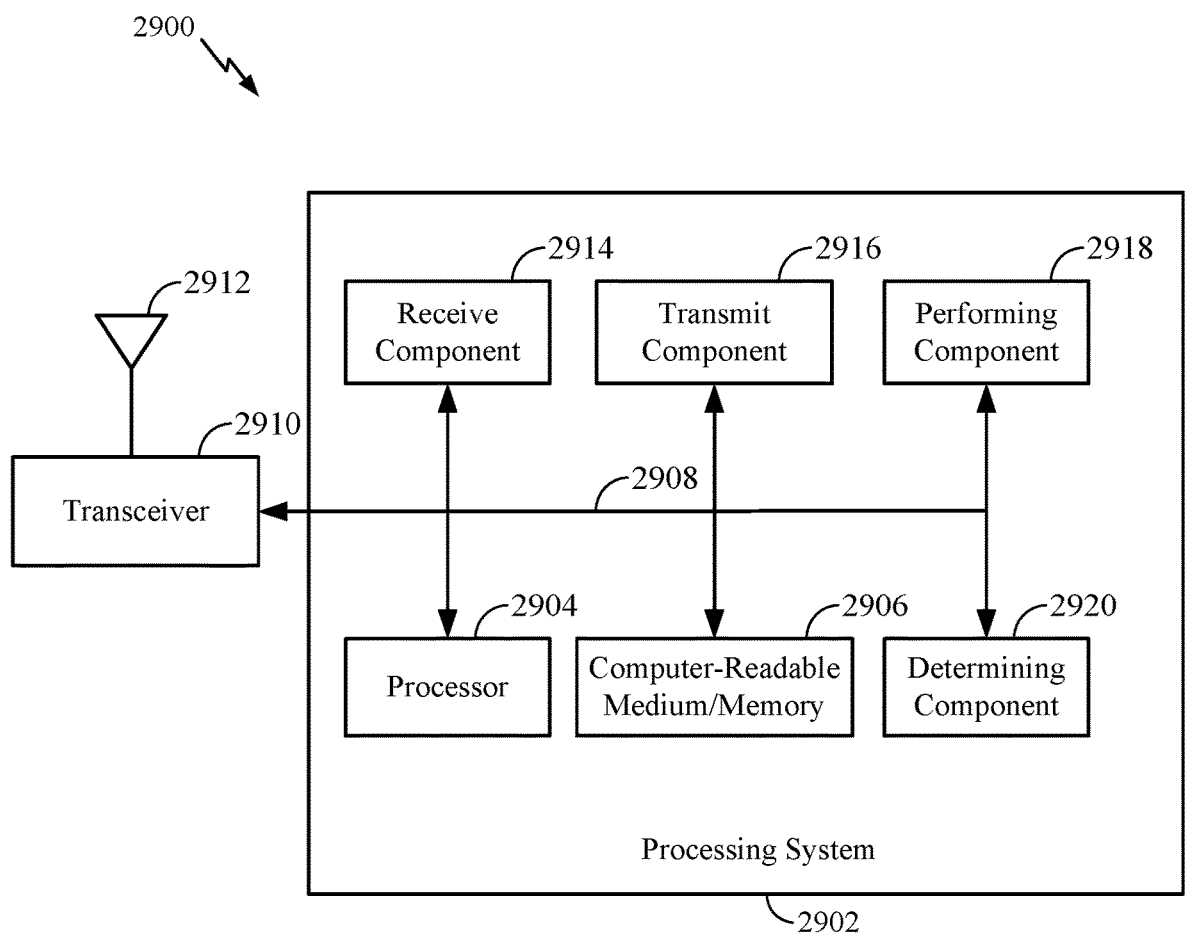
FIG. 29 illustrates a block diagram of an example wireless communication device, in accordance with certain aspects of the present disclosure.

FIG. 29 illustrates a wireless communications device 2900 that may include various components (e.g., corresponding to means-plus-function components) configured to perform operations for the techniques disclosed herein, such as the operations illustrated in one or more of FIGS. 8, 9, 25, and 26. The communications device 2900 includes a processing system 2900 coupled to a transceiver 2910. The transceiver 2910 is configured to transmit and receive signals for the communications device 2900 via an antenna 2912, such as the various signals described herein. The processing system 2902 may be configured to perform processing functions for the communications device 2900, including processing signals received and/or to be transmitted by the communications device 2900.

The processing system 2902 includes one or more processors 2904 coupled to a computer-readable medium/memory 2906 via a bus 2908. In certain aspects, the computer-readable medium/memory 2906 is configured to store computer-executable instructions that when executed by processor 2904, cause the processor 2904 to perform the operations illustrated in one or more of FIGS. 8, 9, 25, and 26, or other operations for performing the various techniques discussed herein.

In certain aspects, the processing system 2902 further includes a receive component 2914 for performing the receiving operations illustrated in one or more of FIGS. 8, 9, 25, and 26. Additionally, the processing system 2902 includes a transmit component 2916 for performing the transmitting operations illustrated in one or more of FIGS. 8, 9, 25, and 26. Further, the processing system 2902 includes a performing component 2918 for performing the performing operations illustrated in one or more of FIGS. 8, 9, 25, and 26. Also, the processing system 2902 includes a determining component 1020 for performing the determining operations illustrated in one or more of FIGS. 8, 9, 25, and 26. The receive component 2914, transmit component 2916, performing component 2918, and determining component 2920 may be coupled to the processor 2904 via bus 2908. The processor 2904 may obtain or output signals via the bus 2908 for performing the operations illustrated in one or more of FIGS. 8, 9, 25, and 26. In certain aspects, the receive component 2914, transmit component 2916, performing component 2918, and determining component 2920 may be hardware circuits. In certain aspects, the receive component 2914, transmit component 2916, performing component 2918, and determining component 2920 may be software components that are executed and run on processor 2904.

Techniques described herein provide advantages to URLLC systems. To improve the latency and reliability of URLLC systems, the RAN may signal to one or more UEs, via the ULPI, to suspend transmissions or reduce the transmit power of transmissions during scheduled URLLC transmissions. This may reduce the interference encountered at the BS and enhance the signal to noise ratio of URLLC signals. Also, cross-carrier information enables the RAN to service more than one carrier component, reducing the signaling overhead to preempt resources as described herein.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting (or means for outputting for transmission) or means for signaling may comprise an antenna(s) 434 of the base station 110 or the antenna(s) 452 of the user equipment 120 illustrated in FIG. 4. Means for receiving (or means for obtaining) may comprise an antenna(s) 434 of the base station 110 or antenna(s) 452 of the user equipment 120 illustrated in FIG. 4. Means for processing, means for obtaining, means for determining, means for taking one or more actions, or means for identifying may comprise a processing system, which may include one or more processors, such as the MIMO detector 436, the TX MIMO processor 430, the TX processor 420, and/or the controller 440 of the base station 110 or the MIMO detector 456, the TX MIMO processor 466, the TX processor 464, and/or the controller 480 of the user equipment 120 illustrated in FIG. 4.

In some cases, rather than actually transmitting a signal, a device may have an interface to output a signal for transmission (a means for outputting). For example, a processor may output a signal, via a bus interface, to a radio frequency (RF) front end for transmission. Similarly, rather than actually receiving a signal, a device may have an interface to obtain a signal received from another device (a means for obtaining). For example, a processor may obtain (or receive) a signal, via a bus interface, from an RF front end for reception. In some cases, an interface to output a signal for transmission and an interface for obtaining a signal may be integrated as a single interface.

As used herein, the terms "transmitting" and "receiving" encompass a wide variety of actions. For example, "transmitting" may include outputting (e.g., outputting a signal to be transmitted), signaling, and the like. Also, "receiving" may include obtaining (e.g., obtaining a signal), accessing (e.g., accessing data in a memory), sampling (e.g., sampling a signal), and the like.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipement 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a first user equipment (UE), comprising:
   signaling an uplink signal to a base station (BS) via uplink channel resources allocated to the first UE of a first type;
   receiving an uplink preemption indication (ULPI) from the BS; and
   taking one or more actions based on one or more resources identified in the ULPI, wherein the one or more resources overlap with resources allocated for a scheduled transmission by a second UE of a second type.

2. The method of claim 1, wherein taking one or more actions comprises:
   reducing a transmit power during the scheduled transmission,
   suspending a transmission by the first UE during the scheduled transmission,
   applying the one or more actions to a resource that is adjacent to one or more resources identified in the ULPI,
   identifying a physical uplink control channel (PUCCH) resource in the one or more resources of the ULPI and signaling uplink control information via the PUCCH resource during the scheduled transmission,
   identifying a sounding reference signal (SRS) resource in the one or more resources of the ULPI and signaling the SRS during the scheduled transmission,
   identifying the SRS resource in the one or more resources and suspending transmission of the SRS during the scheduled transmission, or
   identifying activated, semi-persistently scheduled (SPS) resources in the one or more resources in the ULPI and rate matching a transmission around the activated SPS resources during the scheduled transmission.

3. The method of claim 1, wherein receiving the UPLI comprises receiving the ULPI periodically after one or more symbols or slots.

4. The method of claim 1, wherein the one or more resources identified in the ULPI are relative to a time offset, a time duration, and one or more resources of a reference uplink region.

5. The method of claim 1, wherein the ULPI is specific to one UE.

6. The method of claim 1, wherein the ULPI applies to a plurality of UEs.

7. The method of claim 1, wherein the ULPI comprises a bitmap identifying the one or more resources to be used by the second UE during the scheduled transmission.

8. The method of claim 7, wherein a bit of the bitmap corresponds to at least one of a wideband resource of a reference uplink region (RUR), a subband resource of the RUR, or one or more symbols of the RUR.

9. The method of claim 7, wherein the bitmap indicates to omit downlink resources adjacent to uplink resources in a time division duplex (TDD) configuration.

10. The method of claim 1, further comprising signaling uplink signals with a gap in the signals as indicated by the ULPI and preserving a phase continuity across the gap.

11. The method of claim 1, further comprising signaling uplink signals from the first UE with a gap in the signals as indicated by the ULPI, wherein the signals comprise at least one a demodulation reference signal (DMRS).

12. The method of claim 1, further comprising signaling uplink signals with a gap in the signals as indicated by the ULPI, wherein the gap punctures a demodulation reference signals (DMRS) expected to be received.

13. The method of claim 1, wherein the scheduled transmission uses semi-persistently scheduled (SPS) resources.

14. The method of claim 13, wherein the ULPI comprises a bitmap identifying one or more activated SPS resources, a status of the SPS resources, or a change of status of the SPS resources.

15. The method of claim 1, wherein the ULPI identifies resources corresponding to more than one component carrier or more than one bandwidth part (BWP).

16. The method of claim 1, wherein receiving the ULPI comprises receiving the ULPI via a different location of at least one of a search space or a control resource region than a downlink preemption indication (DLPI).

17. The method of claim 16, wherein the ULPI is signaled using a radio network temporary identifier (RNTI) distinct from a RNTI used to signal the DLPI.

18. The method of claim 1, wherein receiving the ULPI comprises receiving the ULPI using a same location of at least one of a search space or a control resource region and a same radio network temporary identifier (RNTI) as a downlink preemption indication (DLPI), wherein the ULPI includes an indication that it is for uplink preemption.

19. A method for wireless communication by a base station (BS), comprising:
   determining that resources allocated for a scheduled transmission by a first user equipment (UE) of a first type overlap with uplink channel resources allocated to a second UE of a second type; and
   signaling, based on the determination, an uplink preemption indication (ULPI), to the second UE, that identifies at least some of the overlapping resources.

20. The method of claim 19, wherein the signaling the ULPI comprises signaling the ULPI periodically after one or more symbols or slots.

21. The method of claim 19, wherein the one or more resources identified in the ULPI are relative to a time offset, a time duration, and one or more resources of a reference uplink region.

22. The method of claim 19, wherein the ULPI is specific to one UE.

23. The method of claim 19, wherein the ULPI applies to a group of UEs.

24. The method of claim 19, wherein the ULPI comprises a bitmap identifying the one or more resources to be used during the scheduled transmission.

25. The method of claim 24, wherein a bit of the bitmap corresponds to a wideband resource of a reference uplink region (RUR), a subband resource of the RUR, or one or more symbols of the RUR.

26. The method of claim 24, wherein the bitmap indicates to omit downlink resources adjacent to uplink resources in a time division duplex (TDD) configuration.

27. The method of claim 19, further comprising:
receiving uplink signals from the second UE with a gap in the signals as indicated by the ULPI; and
decoding the received signals if the second UE is capable of preserving a phase continuity across the gap.

28. The method of claim 19, wherein the ULPI identifies resources corresponding to more than one component carrier or more than one bandwidth part (BWP).

29. The method of claim 19, wherein signaling the ULPI comprises signaling the ULPI via a different location of at least one of a search space or a control resource region than a downlink preemption indication (DLPI).

30. The method of claim 29, wherein the ULPI is signaled using a radio network temporary identifier (RNTI) distinct from a RNTI used to signal the DLPI.

31. The method of claim 19, wherein signaling the ULPI comprises signaling the ULPI using a same location of at least one of a search space or a control resource region and a same radio network temporary identifier (RNTI) as a downlink preemption indication (DLPI), wherein the ULPI includes an indication that it is for uplink preemption.

32. The method of claim 19, wherein the ULPI excludes at least one of one or more physical uplink control channel (PUCCH) resources, one or more sounding reference signal (SRS) resources, one or more physical random access channel (PRACH) resources, one or more physical broadcast channels (PBCH) resources, one or more demodulation reference signal (DMRS) resources, one or more synchronization signal block (SSB) resources, one or more phase-track reference signal (PTRS) resources, and one or more channel state information reference signal (CSIRS) resources.

33. The method of claim 19, further comprising:
receiving uplink signals from the second UE during the scheduled transmission, wherein the received signals comprise a sounding reference signal (SRS);
receiving the scheduled transmission from the first UE;
decoding the scheduled transmission based at least in part on an effect of the received SRS on the scheduled transmission.

34. The method of claim 19, further comprising:
receiving uplink signals from the second UE with a gap in the signals as indicated by the ULPI, wherein the received signals comprise at least one a demodulation reference signal (DMRS); and
decoding the received signals based on the at least one DMRS.

35. The method of claim 19, further comprising:
receiving uplink signals from the second UE with a gap in the signals as indicated by the ULPI;
determining that the gap punctures a demodulation reference signals (DMRS) expected to be received; and
determining not to decode at least a portion of the received signals based on the determination that the gap punctures the expected DMRS.

36. The method of claim 19, wherein the scheduled transmission uses semi-persistently scheduled (SPS) resources.

37. The method of claim 36, wherein the ULPI comprises a bitmap identifying one or more activated SPS resources, a status of the SPS resources, or a change of status of the SPS resources.

38. An apparatus for wireless communication, comprising:
a processing system configured to determine that resources allocated for a scheduled transmission by a first user equipment (UE) of a first type overlap with uplink channel resources allocated to a second UE of a second type; and
an interface configured to output, based on the determination, an uplink preemption indication (ULPI), to the second UE, that identifies at least some of the overlapping resources.

39. An apparatus for wireless communication, comprising:
an interface configured to:
output an uplink signal to a base station (BS) via uplink channel resources allocated to a first user equipment (UE) of a first type; and
obtain an uplink preemption indication (ULPI) from the BS; and
a processing system configured to take one or more actions based on one or more resources identified in the ULPI, wherein the one or more resources overlap with resources allocated for a scheduled transmission by a second UE of a second type.

40. A method for wireless communication by a base station (BS), comprising:
determining that resources allocated for a transmission to a first user equipment (UE) of a first type overlap with downlink channel resources allocated to a second UE of a second type; and
signaling, based on the determination, a downlink preemption indication (DLPI), to the second UE, that comprises cross-carrier information and identifies at least some of the overlapping resources.

41. The method of claim 40, wherein the cross-carrier information indicates that the resources identified in the DLPI correspond to more than one component carrier.

42. The method of claim 40, wherein the DLPI comprises one or more cross-carrier bitmaps, wherein each bitmap applies to one or more UEs having a specific value of a carrier indicator field (CIF).

43. The method of claim 40, wherein the DLPI is exclusive to a specific value of a carrier indicator field (CIF) assigned to one or more UEs.

44. The method of claim 40, wherein the DLPI is exclusive to the first UE having a specific value of a carrier indicator field (CIF).

45. The method of claim 40, wherein signaling the DLPI comprises signaling the DLPI via a different location of at least one of a search space or a control resource region than an uplink preemption indication (ULPI).

46. The method of claim 45, wherein the DLPI is signaled using a radio network temporary identifier (RNTI) distinct from a RNTI used to signal the ULPI.

47. The method of claim 40, wherein signaling the DLPI comprises signaling the DLPI using a same location of at least one of a search space or a control resource region and a same radio network temporary identifier (RNTI) as an uplink preemption indication (ULPI), wherein the DLPI includes an indication that it is for downlink preemption.

48. A method for wireless communication by a first user equipment (UE), comprising:
   receiving a downlink signal from a base station (BS) using one or more downlink channel resources allocated to the first UE of a first type;
   receiving a downlink preemption indication (DLPI) comprising cross-carrier information from the BS; and
   taking one or more actions based on one or more resources identified in the DLPI, wherein the one or more resources overlap with resources allocated for a scheduled transmission to a second UE of a second type.

49. The method of claim 48, wherein the cross-carrier information indicates that the resources identified in the DLPI correspond to more than one component carrier.

50. The method of claim 48, wherein the DLPI comprises one or more cross-carrier bitmaps, wherein each bitmap applies to one or more UEs having a specific value of a carrier indicator field (CIF).

51. The method of claim 48, wherein the DLPI is exclusive to a specific value of a carrier indicator field (CIF) assigned to one or more UEs.

52. The method of claim 48, wherein the DLPI is exclusive to the first UE having a specific value of a carrier indicator field (CIF).

53. The method of claim 48, wherein receiving the DLPI comprises receiving the DLPI via a different location of at least one of a search space or a control resource region than an uplink preemption indication (ULPI).

54. The method of claim 53, wherein the DLPI is signaled using a radio network temporary identifier (RNTI) distinct from a RNTI used to signal the ULPI.

55. The method of claim 54, wherein receiving the DLPI comprises receiving the DLPI using a same location of at least one of a search space or a control resource region and a same radio network temporary identifier (RNTI) as an uplink preemption indication (ULPI), wherein the DLPI includes an indication that it is for downlink preemption.

56. An apparatus for wireless communication, comprising:
   a processing system configured to determine that resources allocated for a transmission to a first user equipment (UE) of a first type overlap with downlink channel resources allocated to a second UE of a second type; and
   an interface configured to output, based on the determination, a downlink preemption indication (DLPI), to the second UE, that comprises cross-carrier information and identifies at least some of the overlapping resources.

57. An apparatus for wireless communication, comprising:
   an interface configured to:
      obtain a downlink signal from a base station (BS) using one or more downlink channel resources allocated to a first user equipment (UE) of a first type; and
      obtain a downlink preemption indication (DLPI) comprising cross-carrier information from the BS; and
   a processing system configured to take one or more actions based on one or more resources identified in the DLPI, wherein the one or more resources overlap with resources allocated for a scheduled transmission to a second UE of a second type.

* * * * *